United States Patent
Anushiravani et al.

(10) Patent No.: US 12,235,912 B1
(45) Date of Patent: Feb. 25, 2025

(54) DOMAIN-AWARE AUTOCOMPLETE

(71) Applicant: Optum, Inc., Minnetonka, MN (US)

(72) Inventors: Ramin Anushiravani, San Carlos, CA (US); Yizhao Ni, Centennial, CO (US); Harsh M. Maheshwari, Irving, TX (US); Cem Unsal, Alameda, CA (US); Micah David Ketola, Jersey City, NJ (US)

(73) Assignee: Optum, Inc., Minnetonka, MN (US)

( * ) Notice: Subject to any disclaimer, the term of this patent is extended or adjusted under 35 U.S.C. 154(b) by 0 days.

(21) Appl. No.: 18/416,276

(22) Filed: Jan. 18, 2024

Related U.S. Application Data

(60) Provisional application No. 63/578,517, filed on Aug. 24, 2023.

(51) Int. Cl.
| | |
|---|---|
| *G06F 16/9532* | (2019.01) |
| *G06F 16/951* | (2019.01) |
| *G06F 40/58* | (2020.01) |

(52) U.S. Cl.
CPC ........ *G06F 16/9532* (2019.01); *G06F 16/951* (2019.01); *G06F 40/58* (2020.01)

(58) Field of Classification Search
None
See application file for complete search history.

(56) References Cited

U.S. PATENT DOCUMENTS

| | | |
|---|---|---|
| 6,182,068 B1 | 1/2001 | Culliss |
| 6,564,213 B1 | 5/2003 | Ortega et al. |

(Continued)

FOREIGN PATENT DOCUMENTS

| | | |
|---|---|---|
| CA | 2816517 A1 | 4/2012 |
| CA | 2836381 A1 | 11/2012 |

(Continued)

OTHER PUBLICATIONS

Ahmad, Wasi Uddin et al. "Context Attentive Document Ranking and Query Suggestion," In Proceedings of the 42nd International ACM SIGIR Conference on Research and Development in Information Retrieval, Jul. 21-25, 2019, pp. 385-394, DOI: 10.1145/3331184.3331246.

(Continued)

*Primary Examiner* — Eddy Cheung
(74) *Attorney, Agent, or Firm* — Alston & Bird LLP

(57) ABSTRACT

Various embodiments of the present disclosure provide model-based domain-aware autocomplete techniques for generating autocomplete suggestions in a complex search domain. Example embodiments are configured to generate, using a domain-aware autocomplete model, a label for an autocomplete suggestion based on a set of keywords within an autocomplete suggestion training dataset associated with a target domain source. Example embodiments are also configured to generate, using a weak-labeling model, an updated label for the autocomplete suggestion by decorrelating the set of keywords from the label. Example embodiments are also configured to generate, using a sentence classification model, a category for the autocomplete suggestion based on the updated label. Example embodiments are also configured to, using the domain-aware autocomplete model, generate a suggestion-category pair (SCP) based on the autocomplete suggestion and the category for the autocomplete suggestion. Example embodiments are also configured for initiating performance of a search query resolution based on the SCP.

20 Claims, 12 Drawing Sheets

(56) References Cited

U.S. PATENT DOCUMENTS

| | | |
|---|---|---|
| 6,738,754 B1 | 5/2004 | Norman, Jr. |
| 7,548,910 B1 | 6/2009 | Chu et al. |
| 7,657,522 B1 | 2/2010 | Puzicha et al. |
| 7,933,859 B1 | 4/2011 | Puzicha et al. |
| 8,100,829 B2 | 1/2012 | Rothman et al. |
| 8,312,138 B2 | 11/2012 | Hull et al. |
| 8,392,207 B2 | 3/2013 | Olaniyan |
| 8,403,847 B2 | 3/2013 | Rothman et al. |
| 8,583,450 B2 | 11/2013 | Baker et al. |
| 8,620,842 B1 | 12/2013 | Cormack |
| 8,706,530 B2 | 4/2014 | Ohnemus et al. |
| 8,793,252 B2 | 7/2014 | Subasic et al. |
| 8,972,397 B2 | 3/2015 | Imig et al. |
| 8,996,314 B2 | 3/2015 | Ohnemus et al. |
| 9,058,327 B1 | 6/2015 | Lehrman et al. |
| 9,424,532 B1 | 8/2016 | Abedini et al. |
| 9,436,760 B1 | 9/2016 | Tacchi et al. |
| 9,977,866 B2 | 5/2018 | Norris et al. |
| 10,026,114 B2 | 7/2018 | Tolvanen et al. |
| 10,062,039 B1 | 8/2018 | Lockett |
| 10,176,541 B2 | 1/2019 | Chaudhri et al. |
| 10,262,384 B1 | 4/2019 | Albro et al. |
| 10,380,210 B1 | 8/2019 | Lai et al. |
| 10,394,894 B2 | 8/2019 | Garg et al. |
| 10,409,874 B2 | 9/2019 | Cheng |
| 10,413,779 B2 | 9/2019 | Ingram et al. |
| 10,438,291 B1 | 10/2019 | Neben et al. |
| 10,489,440 B2 | 11/2019 | Sharma et al. |
| 10,803,241 B2 | 10/2020 | Weisman et al. |
| 10,943,072 B1 | 3/2021 | Jaganmohan |
| 10,943,178 B1 | 3/2021 | Gao et al. |
| 10,977,254 B2 | 4/2021 | Claussenelias et al. |
| 11,004,135 B1 | 5/2021 | Sandler et al. |
| 11,055,324 B1 | 7/2021 | Inoue et al. |
| 11,238,113 B2 | 2/2022 | Freese et al. |
| 11,276,089 B1 | 3/2022 | Salehie et al. |
| 11,416,535 B2 | 8/2022 | Counts et al. |
| 11,636,949 B2 | 4/2023 | Goldberg et al. |
| 11,775,989 B1 | 10/2023 | Hao et al. |
| 12,080,398 B2 | 9/2024 | Nida et al. |
| 2002/0103680 A1 | 8/2002 | Newman |
| 2003/0163349 A1 | 8/2003 | Ho |
| 2004/0019601 A1 | 1/2004 | Gates |
| 2004/0073538 A1 | 4/2004 | Leishman et al. |
| 2005/0060194 A1 | 3/2005 | Brown |
| 2005/0075931 A1 | 4/2005 | Pearson |
| 2005/0080786 A1 | 4/2005 | Fish et al. |
| 2005/0165627 A1 | 7/2005 | Fotsch et al. |
| 2008/0133272 A1 | 6/2008 | Marshall |
| 2009/0132573 A1 | 5/2009 | Reed, Jr. et al. |
| 2009/0254402 A1 | 10/2009 | Beall |
| 2009/0292555 A1 | 11/2009 | Brown |
| 2010/0063846 A1 | 3/2010 | Shakamuri |
| 2010/0076786 A1 | 3/2010 | Dalton et al. |
| 2010/0131482 A1 | 5/2010 | Linthicum et al. |
| 2010/0131498 A1 | 5/2010 | Linthicum et al. |
| 2010/0179839 A1 | 7/2010 | Collins et al. |
| 2011/0077973 A1 | 3/2011 | Breitenstein et al. |
| 2011/0161110 A1 | 6/2011 | Mault |
| 2011/0264513 A1 | 10/2011 | Ratnaparkhi |
| 2012/0089413 A1 | 4/2012 | Balassanian |
| 2012/0296455 A1 | 11/2012 | Ohnemus et al. |
| 2013/0024474 A1 | 1/2013 | Kraft et al. |
| 2013/0073686 A1 | 3/2013 | Sandholm |
| 2013/0211858 A1 | 8/2013 | Ohnemus et al. |
| 2013/0232006 A1 | 9/2013 | Holcomb et al. |
| 2014/0067423 A1 | 3/2014 | Joao |
| 2014/0088986 A1 | 3/2014 | Gowdy et al. |
| 2014/0100860 A1 | 4/2014 | Stollmeyer et al. |
| 2014/0129493 A1 | 5/2014 | Leopold |
| 2014/0156308 A1 | 6/2014 | Ohnemus et al. |
| 2014/0280289 A1 | 9/2014 | Marantz et al. |
| 2014/0310013 A1 | 10/2014 | Ram et al. |
| 2014/0316811 A1 | 10/2014 | Ohnemus et al. |
| 2014/0372133 A1 | 12/2014 | Austrum et al. |
| 2015/0234987 A1 | 8/2015 | Laing et al. |
| 2015/0331878 A1 | 11/2015 | Joseph et al. |
| 2016/0048646 A1 | 2/2016 | Stover et al. |
| 2016/0078101 A1 | 3/2016 | Somaiya et al. |
| 2016/0085799 A1 | 3/2016 | Kim et al. |
| 2016/0092598 A1 | 3/2016 | Mishra |
| 2016/0110826 A1 | 4/2016 | Morimoto et al. |
| 2017/0249713 A1 | 8/2017 | Serbinis et al. |
| 2017/0270115 A1 | 9/2017 | Cormack et al. |
| 2017/0293923 A1 | 10/2017 | Margolis et al. |
| 2017/0308583 A1 | 10/2017 | Husain et al. |
| 2018/0025334 A1 | 1/2018 | Pourfallah et al. |
| 2018/0082030 A1 | 3/2018 | Allen et al. |
| 2018/0165288 A1 | 6/2018 | Chang et al. |
| 2018/0341875 A1 | 11/2018 | Carr |
| 2019/0005409 A1 | 1/2019 | Doshi et al. |
| 2019/0171728 A1 | 6/2019 | Wakankar et al. |
| 2019/0188251 A1* | 6/2019 | Liu ............ G06F 40/274 |
| 2019/0325031 A1 | 10/2019 | Puzicha |
| 2020/0005149 A1 | 1/2020 | Ramanath et al. |
| 2020/0073953 A1 | 3/2020 | Kulkarni |
| 2020/0092695 A1 | 3/2020 | Vigeant et al. |
| 2020/0279641 A1 | 9/2020 | Nida et al. |
| 2020/0320139 A1 | 10/2020 | Duishoev et al. |
| 2020/0342010 A1 | 10/2020 | Rosomoff |
| 2020/0350072 A1 | 11/2020 | Mcewing et al. |
| 2020/0365259 A1 | 11/2020 | Chmait et al. |
| 2020/0388402 A1 | 12/2020 | Frey et al. |
| 2020/0411146 A1 | 12/2020 | Mcewing et al. |
| 2021/0027870 A1 | 1/2021 | West |
| 2021/0090694 A1 | 3/2021 | Colley et al. |
| 2021/0141860 A1 | 5/2021 | Karagiannis et al. |
| 2021/0174164 A1 | 6/2021 | Hsieh et al. |
| 2021/0209095 A1 | 7/2021 | Gallant |
| 2021/0241204 A1 | 8/2021 | Stein |
| 2021/0319520 A1 | 10/2021 | Winters |
| 2021/0398077 A1 | 12/2021 | Lomurray et al. |
| 2022/0005566 A1 | 1/2022 | Lyman et al. |
| 2022/0035677 A1* | 2/2022 | Tambi ............ G06F 40/263 |
| 2022/0035869 A1 | 2/2022 | Beck et al. |
| 2022/0067841 A1 | 3/2022 | Hanson |
| 2022/0198573 A1 | 6/2022 | Brown et al. |
| 2022/0384052 A1 | 12/2022 | Gnanasambandam et al. |
| 2023/0138014 A1 | 5/2023 | Sebastian |
| 2023/0169139 A1 | 6/2023 | Baek et al. |
| 2023/0170092 A1 | 6/2023 | Moon et al. |
| 2023/0252338 A1 | 8/2023 | Ayyadevara et al. |
| 2023/0283987 A1 | 9/2023 | Cheng et al. |
| 2023/0409614 A1 | 12/2023 | Hamilton et al. |
| 2024/0054326 A1 | 2/2024 | Dave et al. |
| 2024/0248901 A1 | 7/2024 | Krishnan et al. |
| 2024/0265431 A1 | 8/2024 | Jimnez et al. |

FOREIGN PATENT DOCUMENTS

| | | |
|---|---|---|
| CA | 2841006 A1 | 1/2013 |
| CN | 103329135 A | 9/2013 |
| CN | 107665217 A | 2/2018 |
| CN | 108304439 B | 7/2021 |
| EP | 2622568 A1 | 8/2013 |
| EP | 2710503 A1 | 3/2014 |
| EP | 2729912 A1 | 5/2014 |
| IN | 201941028487 A | 1/2021 |
| WO | 2012/050969 A1 | 4/2012 |
| WO | 2012/156374 A1 | 11/2012 |
| WO | 2013/004706 A1 | 1/2013 |
| WO | 2014/087252 A2 | 6/2014 |
| WO | 2023/278037 A1 | 1/2023 |

OTHER PUBLICATIONS

Bao, et al., "Medical Code Prediction via Capsule Networks and ICD Knowledge", BMC Medical Informatics and Decision Making, vol. 21 (Suppl. 2):55, Jul. 30, 2021, (12 pages), doi.org/10.1186/s12911-021-01426-9.

Chapelle, Olivier et al. "A Dynamic Bayesian Network Click Model For Web Search Ranking," In Proceedings of the 18th International Conference On World Wide Web, Apr. 20, 2009, pp. 1-10, Madrid,

(56) References Cited

OTHER PUBLICATIONS

Spain, available online at https://citeseerx.ist.psu.edu/viewdoc/download?doi=10.1.1.180.337&rep=rep1&type=pdf.

Clinical Management Guidelines for Obstetrician-Gynecologists, The American College Of Obstetricians and Gynecologists Practice Bulletin, No. 109, Dec. 2009, pp. 1-12.

Dao, Tien Tuan et al. "Knowledge-Based Personalized Search Engine For The Web-Based Human Musculoskeletal System Resources (HMSR) In Biomechanics," Journal of Biomedical Informatics, vol. 46, pp. 160-173, Feb. 1, 2013, (ePub: Nov. 10, 2012), DOI: 10.1016/j.jbi.2012.11.001.

Galli, Keith. Galli K. "High-Performance Intent Classification In Sparse Supervised Data Conditions," Doctoral Dissertation, Massachusetts Institute of Technology, Jun. 2019, (62 pages), available online: https://dspace.mit.edu/bitstream/handle/1721.1/123200/1128822757-MIT.pdf?sequence=1&isAllowed=y.

Gupta, Jai et al. "Personalized Online Spell Correction For Personal Search," In Proceedings of the 2019 World Wide Web Conference (WWW'19), May 13-17, 2019, (7 pages), DOI: 10.1145/3308558.3313706.

Hwang, Sewoong et al. "Toward A Chatbot For Financial Sustainability," Sustainability, vol. 13, No. 6:3173, Mar. 13, 2021, pp. 1-18, DOI: 10.3390/su13063173.

International Search Report and Written Opinion for International Application No. PCT/US2023/015396, dated Jun. 19, 2023, (13 pages), European Patent Office, Rijswijk, Netherlands.

Lemoine, Julien, et al., "Predictive Search and Autocomplete", Algolia Blog, (14 pages), Dec. 6, 2022, Retrieved from the Internet https://web.archive.org/web/20221206165729/https://www.algolia.com/blog/ai/predictive-search-and-autocomplete/.

Li, Jianqiang et al. "Diversity-Aware Retrieval Of Medical Records," Computers In Industry, vol. 29, pp. 81-91, May 2015, DOI: http://dx.doi.org/10.1016/j.compind.2014.09.004.

Miller, Alissa S. et al. "Improving Stage Of Change In An Employee Wellness Program," Workplace Health & Safety, vol. 67, No. 8, pp. 381-290, Aug. 2019, DOI: 10.1177/2165079919838291.

Momma, Michinari et al. "Multi-Objective Relevance Ranking," In Proceedings of the SIGIR 2019 eCom Workshop, Jul. 2019, (8 pages), Paris, France, DOI: https://assets.amazon.science/6f/7f/a34aac77415ead5d4d518d5b1801/multi-objective-relevance-ranking.pdf.

Non-Final Rejection Mailed on Feb. 26, 2024 for U.S. Appl. No. 17/971,491, 11 page(s).

Non-Final Rejection Mailed on Jun. 20, 2024 for U.S. Appl. No. 18/314,441, 15 page(s).

Non-Final Rejection Mailed on Mar. 13, 2024 for U.S. Appl. No. 17/934,688, 20 page(s).

Perrault, Evan K. et al. "Employees' Refusals To Participate In An Employer-Sponsored Wellness Program: Barriers and Benefits To Engagement," Compensation & Benefits Review, vol. 52, No. 1, p. 8-18, Jan. 2020, DOI: 10.1177/0886368719899209.

Sun, Xu et al. "Feature-Frequency-Adaptive On-Line Training For Fast and Accurate Natural Language Processing," Computational Linguistic, vol. 40, No. 3, Sep. 1, 2014, pp. 563-596.

U.S. Provisional Patent Application, "Automated Health Data Acquisition, Processing And Communication System", Unpublished (filing date Nov. 30, 2012), (Peter Ohnemus, Inventor), 98 pages, U.S.A., U.S. Appl. No. 61/732,203.

U.S. Provisional Patent Application, "Health Data Acquisition, Processing and Communication System", Unpublished (filing date Jun. 9, 2011), (Peter Ohnemus, Inventor), 50 pages, U.S.A., U.S. Appl. No. 61/495,247.

U.S. Provisional Patent Application, "Health Data Acquisition, Processing and Communication System", Unpublished (filing date Sep. 29, 2010), (Peter Ohnemus, Inventor), 31 pages, U.S.A., U.S. Appl. No. 61/387,906.

U.S. Provisional Patent Application, "System And Method For Personal Energy Expenditure Analyses", Unpublished (filing date May 16, 2011), (Peter Ohnemus, Inventor), 35 pages, U.S.A., U.S. Appl. No. 61/486,658.

Wu, Qiang et al. "Adapting Boosting For Information Retrieval Measures," Learning To Rank For Information Retrieval, vol. 13, pp. 254-270, Jun. 2010, DOI: https://citeseerx.ist.psu.edu/viewdoc/download?doi=10.1.1.157.5117&rep=rep1&type=pdf.

"Semantic Textual Similarity," SBERT.net, (2 pages), (2024), [retrieved from the Internet Sep. 13, 2024] <URL: https://www.sbert.net/examples/training/sts/README.html>.

Alla, Samhita. "A Guide To Bidirectional RNNs With Keras," Paperspace Blog, (2020), (11 pages), (article, online), [retrieved from the Internet Sep. 13, 2024] <URL: https://blog.paperspace.com/bidirectional-rnn-keras/#:~:text=A%20Bidirectional%20RNN%20is%20a,the%20beginning%20of%20a%20sequence>.

Bern, Erik. "Spotify/Annoy: Approximate Nearest Neighbors In C++/Python Optimized For Memory Usage and Loading/Saving To Disk," GitHub, Apr. 10, 2023, (8 pages), [retrieved from the Internet Sep. 13, 2024] <URL: https://github.com/spotify/annoy>.

Briggs, James. "BERT For Next Sentence Prediction," Towards Data Science, May 25, 2021, (7 pages), (article, online) [retrieved from the Internet Sep. 13, 2024] <URL: https://towardsdatascience.com/bert-for-next-sentence-prediction-466b67f8226f>.

Coates, Dustin. "How NLP & NLU Work For Semantic Search," Search Engine Journal, Apr. 25, 2022, (15 pages), [retrieved from the Internet Sep. 11, 2024] <URL: https://www.searchenginejournal.com/nlp-nlu-semantic-search/444694/>.

Corrected Notice of Allowance and Fees Due (PTOL-85), Sep. 12, 2024, U.S. Appl. No. 18/484,943, (4 pages).

Doshi, Sanket. "Skip-Gram: NLP Context Words Prediction Algorithm," Towards Data Science, Mar. 16, 2019, (12 pages), (article, online), [retrieved from the Internet Sep. 13, 2024] <URL: https://towardsdatascience.com/skip-gram-nlp-context-words-prediction-algorithm-5bbf34f84e0c>.

Final Office Action for U.S. Appl. No. 17/934,688, dated Sep. 13, 2024, (20 pages), U.S. Patent and Trademark Office, US.

NonFinal Office Action for U.S. Appl. No. 18/520,662, filed Sep. 10, 2024, (17 pages), U.S. Patent and Trademark Office, US.

Notice of Allowance and Fees Due (PTOL-85) Mailed on Aug. 23, 2024 for U.S. Appl. No. 18/484,943, 14 page(s).

Yan, et al., "A Survey of Automated International Classification of Diseases Coding: Development, Challenges, and Applications", Intelligent Medicine, vol. 2, pp. 161-173, Mar. 11, 2022, https://doi.org/10.1016/j.imed.2022.03.003.

Final Rejection Mailed on Sep. 13, 2024 for U.S. Appl. No. 17/934,688, 20 page(s).

McCreadie, Richard et al. "A Study of Personalised Medical Literature Search," In International Conference of the Cross-Language Evaluation Forum for European Languages, Sep. 15, 2014, pp. 74-85, Springer, Cham, DOI: 10.1007/978-3-319-11382-1_8.

Non-Final Rejection Mailed on Sep. 10, 2024 for U.S. Appl. No. 18/520,662, 17 page(s).

Non-Final Rejection Mailed on Sep. 20, 2024 for U.S. Appl. No. 18/047,209, 46 page(s).

Notice of Allowance and Fees Due (PTOL-85) Mailed on Sep. 12, 2024 for U.S. Appl. No. 18/484,943, 4 page(s).

Notice of Allowance and Fees Due (PTOL-85) Mailed on Sep. 25, 2024 for U.S. Appl. No. 18/484,943, 4 page(s).

Yadav, Nishant et al. "Session Aware Query Auto Completion Using Extreme Multi-Label Ranking," arXiv Preprint arXiv:2012.07654v2 [cs.IR], Jun. 7, 2021, (10 pages), available online: https://assets.amazon.science/5e/76/6ebacfc240e1a58b69a6f5347833/session-aware-query-auto-completion-using-extreme-multi-label-ranking.pdf.

* cited by examiner

MANAGEMENT COMPUTING ENTITIES
104a-n

USER COMPUTING ENTITIES
102a-n

DOMAIN-AWARE AUTOCOMPLETE

CROSS-REFERENCE TO RELATED APPLICATIONS

This application claims the benefit of U.S. Provisional Application No. 63/578,517, entitled "Domain-Aware Autocomplete," and filed Aug. 24, 2023, the entire contents of which are hereby incorporated by reference.

BACKGROUND

Various embodiments of the present disclosure address technical challenges related to autocomplete-driven search practices commonly employed on various webpages. Traditional autocomplete solutions are static and may employ a limited set of vocabulary for generating autocomplete suggestions. Previous autocomplete techniques employed user query logs aggregated over a predefined period to extract autocomplete suggestions and build an autocomplete vocabulary. However, such techniques may generate autocomplete suggestions that are incorrectly spelled, inconsistent, and/or offer a low variety (e.g., present the same autocomplete suggestion in different tenses). Such autocomplete suggestions are also a poor predictor of the current data available on a respective website. For example, null search results generated based on search queries made in the past may no longer be null today or, alternatively, valid search results generated based on search queries made in the past may nevertheless result in null results based on the current data associated with the respective website.

Various embodiments of the present disclosure make important contributions to traditional autocomplete techniques by addressing these technical challenges, among others.

BRIEF SUMMARY

Various embodiments of the present disclosure provide computer-implemented methods, computer systems, computer program products, apparatuses, and/or the like configured to provide a domain-aware autocomplete model for generating domain-aware autocomplete suggestions based on one or more portions of textual data associated with a search query related to a target domain associated with a respective enterprise, organization, and/or institution. In various embodiments, the domain-aware autocomplete model is language agnostic and may be customized to adapt to, and/or be trained in part by, one or more target domain sources associated with a particular target domain. As such, the domain-aware autocomplete model is incrementally scalable and may be employed to generate domain-specific autocomplete suggestions for search queries related to any number of scientific and/or technological domains including clinical domains, healthcare domains, medical domains, medicinal domains, insurance domains, therapy domains, engineering domains, aerospace domains, industrial domains, petrochemical domains, agricultural domains, educational domains, and/or any other relevant, complex scientific and/or technological domain.

In some embodiments, a computer-implemented method includes generating, by one or more processors and using a domain-aware autocomplete model, a label for an autocomplete suggestion based on a set of keywords within an autocomplete suggestion training dataset associated with a target domain source; generating, by the one or more processors and using a weak-labeling model, an updated label for the autocomplete suggestion by decorrelating the set of keywords from the label; generating, by the one or more processors and using a sentence classification model, a category for the autocomplete suggestion based on the updated label; generating, by the one or more processors and using the domain-aware autocomplete model, a suggestion-category pair (SCP) based on the autocomplete suggestion and the category for the autocomplete suggestion; and initiating, by the one or more processors, performance of a search query resolution based on the SCP.

In some embodiments, a computing system includes memory and one or more processors communicatively coupled to the memory, the one or more processors are configured to generate, by one or more processors and using a domain-aware autocomplete model, a label for an autocomplete suggestion based on a set of keywords within an autocomplete suggestion training dataset associated with a target domain source; generate, by the one or more processors and using a weak-labeling model, an updated label for the autocomplete suggestion by decorrelating the set of keywords from the label; generate, by the one or more processors and using a sentence classification model, a category for the autocomplete suggestion based on the updated label; generate, by the one or more processors and using the domain-aware autocomplete model, an SCP based on the autocomplete suggestion and the category for the autocomplete suggestion; and initiate, by the one or more processors, performance of a search query resolution based on the SCP.

In some examples, one or more non-transitory computer-readable storage media includes instructions that, when executed by one or more processors, cause the one or more processors to generate, by one or more processors and using a domain-aware autocomplete model, a label for an autocomplete suggestion based on a set of keywords within an autocomplete suggestion training dataset associated with a target domain source; generate, by the one or more processors and using a weak-labeling model, an updated label for the autocomplete suggestion by decorrelating the set of keywords from the label; generate, by the one or more processors and using a sentence classification model, a category for the autocomplete suggestion based on the updated label; generate, by the one or more processors and using the domain-aware autocomplete model, an SCP based on the autocomplete suggestion and the category for the autocomplete suggestion; and initiate, by the one or more processors, performance of a search query resolution based on the SCP.

DETAILED DESCRIPTION

Figure 1:
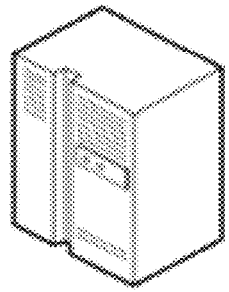
FIG. 1 is a diagram of a computing system that may be used to practice various embodiments of the present disclosure.
Figure 1:
Figure 1:
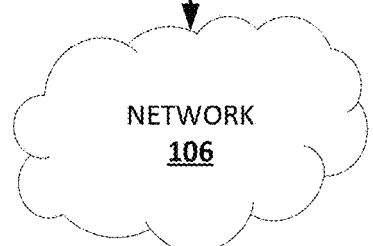
Figure 1:
Figure 1:
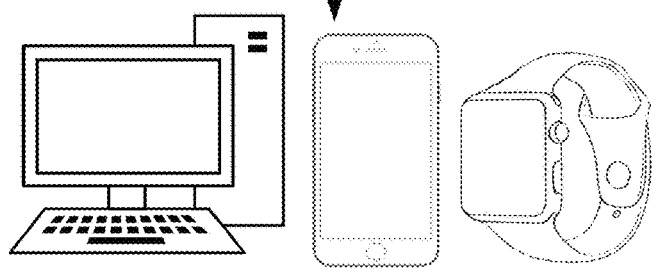

Various embodiments of the present disclosure are described more fully hereinafter with reference to the accompanying drawings, in which some, but not all embodiments of the present disclosure are shown. Indeed, the present disclosure may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "example" are used to be examples with no indication of quality level. Terms such as "computing," "determining," "generating," and/or similar words are used herein interchangeably to refer to the creation, modification, or identification of data. Further, "based on," "based at least in part on," "based at least on," "based upon," and/or similar words are used herein interchangeably in an open-ended manner such that they do not indicate being based only on or based solely on the referenced element or elements unless so indicated. Like numbers refer to like elements throughout. Moreover, while certain embodiments of the present disclosure are described with reference to predictive data analysis, one of ordinary skills in the art will recognize that the disclosed concepts may be used to perform other types of data analysis.

I. COMPUTER PROGRAM PRODUCTS, METHODS, AND COMPUTING ENTITIES

Embodiments of the present disclosure may be implemented in various ways, including as computer program products that include articles of manufacture. Such computer program products may include one or more software components including, for example, software objects, methods, data structures, or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or operating system platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query, or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together, such as in a particular directory, folder, or library. Software components may be static (e.g., pre-established, or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In some embodiments, a non-volatile computer-readable storage medium may include a floppy disk, flexible disk, hard disk, solid-state storage (SSS) (e.g., a solid-state drive (SSD), solid state card (SSC), solid state module (SSM), enterprise flash drive, magnetic tape, or any other non-transitory magnetic medium, and/or the like). A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In some embodiments, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for, or used in addition to, the computer-readable storage media described above.

As should be appreciated, various embodiments of the present disclosure may also be implemented as methods, apparatuses, systems, computing devices, computing entities, and/or the like. As such, embodiments of the present disclosure may take the form of an apparatus, system, computing device, computing entity, and/or the like executing instructions stored on a computer-readable storage medium to perform certain steps or operations. Thus, embodiments of the present disclosure may also take the form of an entirely hardware embodiment, an entirely computer program product embodiment, and/or an embodiment that includes a combination of computer program products and hardware performing certain steps or operations.

Embodiments of the present disclosure are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatuses, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some example embodiments, retrieval, loading, and/or execution may be performed in parallel such that multiple instructions are retrieved, loaded, and/or executed together. Thus, such embodiments may produce specifically configured machines performing the steps or operations specified in the block diagrams and flowchart illustrations. Accordingly, the block diagrams and flowchart illustrations support various combinations of embodiments for performing the specified instructions, operations, or steps.

II. SYSTEM ARCHITECTURE

FIG. 1 is a diagram of a computing system 100 that may be used to practice various embodiments of the present disclosure. As shown in FIG. 1, the computing system 100 may include one or more user computing entities 102a-n, one or more management computing entities 104a-n, one or more networks 106, and/or the like. Each of the components of the computing system 100 may be in electronic communication with, for example, one another over the same or different wireless or wired networks 106 including, for example, a wired or wireless Personal Area Network (PAN), Local Area Network (LAN), Metropolitan Area Network (MAN), Wide Area Network (WAN), and/or the like. Additionally, while FIG. 1 illustrates certain system devices as separate, standalone devices, the various embodiments are not limited to this particular architecture.

Management Computing Entity

Figure 2:
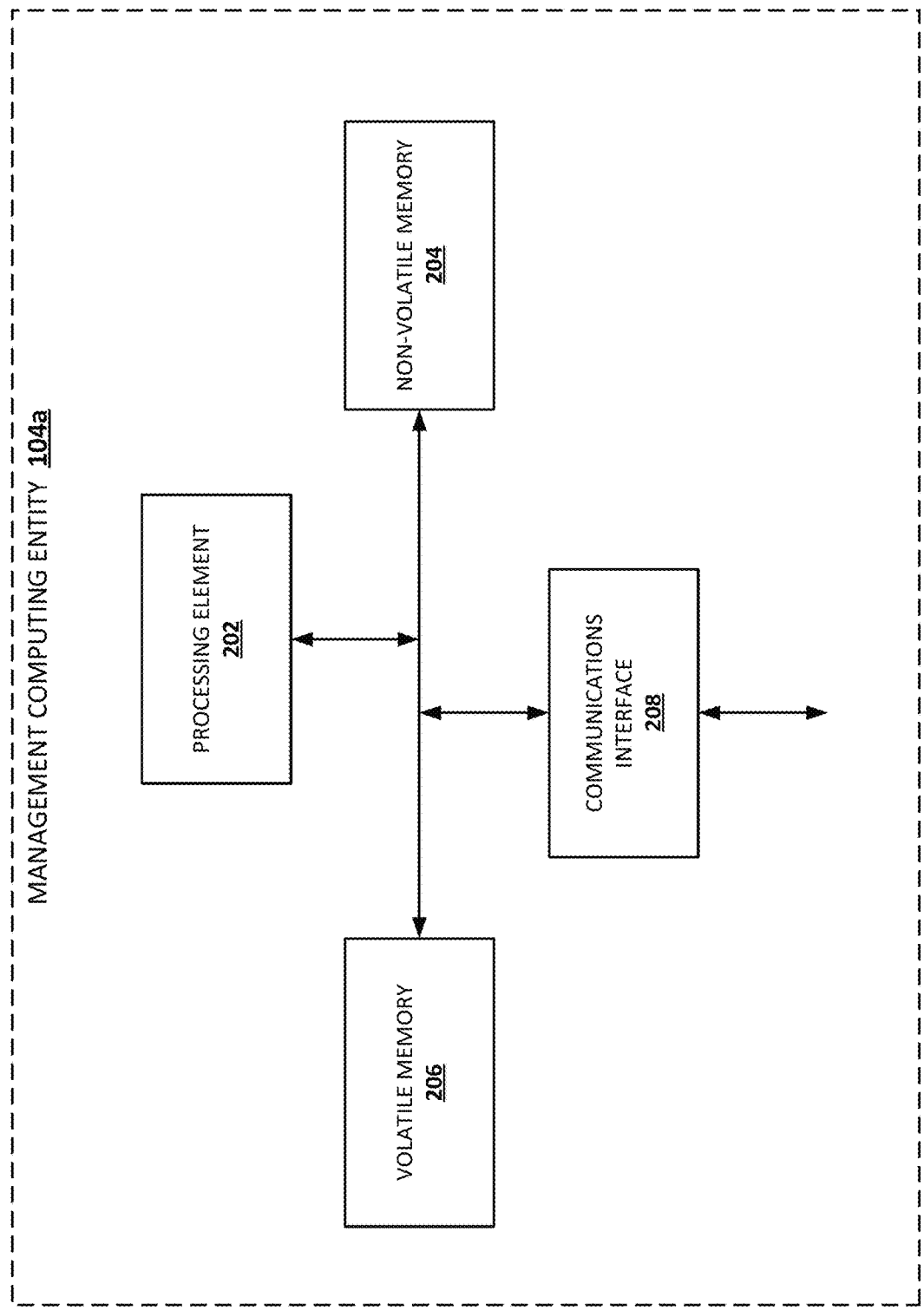
FIG. 2 is a schematic diagram of a management computing entity in accordance with certain embodiments of the present disclosure.

FIG. 2 is a schematic diagram of a management computing entity 104a in accordance with certain embodiments of the present disclosure. In general, the terms computing device, entity, device, system, and/or similar words used herein interchangeably may refer to, for example, one or more computers, computing devices, computing entities, desktop computers, mobile phones, tablets, phablets, notebooks, laptops, distributed systems, terminals, servers or server networks, blades, gateways, switches, processing devices, set-top boxes, relays, routers, network access points, base stations, the like, and/or any combination of devices adapted to perform the functions, operations, and/or processes described herein. Such functions, operations, and/or processes may include, for example, transmitting, receiving, operating on, processing, displaying, storing, determining, generating/creating, monitoring, evaluating, comparing, and/or similar terms used herein interchangeably. In one embodiment, these functions, operations, and/or processes may be performed on data, content, information, and/or similar terms used herein interchangeably.

As indicated, in one embodiment, the management computing entity 104a may also include one or more network and/or communications interfaces 208 for communicating with various computing entities, such as by communicating data, content, information, and/or similar terms used herein interchangeably that may be transmitted, received, operated on, processed, displayed, stored, and/or the like.

As shown in FIG. 2, in one embodiment, the management computing entity 104a may include or be in communication with one or more processing elements 205 (also referred to as processors, processing circuitry, and/or similar terms used herein interchangeably) that communicate with other elements within the management computing entity 104a via a bus, for example. As will be understood, the processing element 202 may be embodied in a number of different ways. For example, the processing element 202 may be embodied as one or more complex programmable logic devices (CPLDs), microprocessors, multi-core processors, coprocessing devices, application-specific instruction-set processors (ASIPs), and/or controllers. Further, the processing element 202 may be embodied as one or more other processing devices or circuitry. The term circuitry may refer to an entirely hardware embodiment or a combination of hardware and computer program products. Thus, the processing element 202 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 202 may be configured for a particular use or configured to execute instructions stored in volatile or non-volatile media or otherwise accessible to the processing element 202. As such, whether configured by hardware or computer program products, or by a combination thereof, the processing element 202 may be capable of performing steps or operations according to embodiments of the present disclosure when configured accordingly.

In one embodiment, the management computing entity 104a may further include or be in communication with non-volatile media (also referred to as non-volatile storage, memory, memory storage, memory circuitry and/or similar terms used herein interchangeably). In one embodiment, the non-volatile storage or memory may include one or more non-volatile storage or memory media 204 as described above, such as hard disks, ROM, PROM, EPROM, EEPROM, flash memory, MMCs, SD memory cards, Memory Sticks, CBRAM, PRAM, FeRAM, RRAM, SONOS, racetrack memory, and/or the like. As will be recognized, the non-volatile storage or memory media may store databases, database instances, database management system entities, data, applications, programs, program modules, scripts, source code, object code, byte code, compiled code, interpreted code, machine code, executable instructions, and/or the like. The term database, database instance, database management system entity, and/or similar terms used herein interchangeably may refer to a structured collection of records or information/data that is stored in a computer-readable storage medium, such as via a relational database, hierarchical database, and/or network database.

In one embodiment, the management computing entity 104a may further include or be in communication with volatile media (also referred to as volatile storage, memory, memory storage, memory circuitry and/or similar terms used herein interchangeably). In one embodiment, the volatile storage or memory may also include one or more volatile storage or memory media 206 as described above, such as RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. As will be recognized, the volatile storage or memory media may be used to store at least portions of the databases, database instances, database management system entities, data, applications, programs, program modules, scripts, source code, object code, byte code, compiled code, interpreted code, machine code, executable instructions, and/or the like being executed by, for example, the processing element 202. Thus, the databases, database instances, database management system entities, data, applications, programs, program modules, scripts, source code, object code, byte code, compiled code, interpreted code, machine code, executable instructions, and/or the like may be used to control certain aspects of the operation of the management computing entity 104a with the assistance of the processing element 202 and the operating system.

As indicated, in one embodiment, the management computing entity 104a may also include one or more network and/or communications interfaces 208 for communicating with various computing entities, such as by communicating data, content, information, and/or similar terms used herein interchangeably that may be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, management computing entity 104a may be configured to communicate via wireless external communication networks using any of a variety of protocols, such as general packet radio service (GPRS), Universal Mobile Telecommunications System (UMTS), Code Division Multiple Access 200 (CDMA200), CDMA200 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), IR protocols, NFC protocols, RFID protocols, IR protocols, ZigBee protocols, Z-Wave protocols, 6LoWPAN protocols, Wibree, Bluetooth protocols, wireless universal serial bus (USB) protocols, and/or any other wireless protocol.

The management computing entity 104a may use such protocols and standards to communicate using Border Gateway Protocol (BGP), Dynamic Host Configuration Protocol (DHCP), Domain Name System (DNS), File Transfer Protocol (FTP), Hypertext Transfer Protocol (HTTP), HTTP over TLS/SSL/Secure, Internet Message Access Protocol (IMAP), Network Time Protocol (NTP), Simple Mail Transfer Protocol (SMTP), Telnet, Transport Layer Security (TLS), Secure Sockets Layer (SSL), Internet Protocol (IP), Transmission Control Protocol (TCP), User Datagram Protocol (UDP), Datagram Congestion Control Protocol (DCCP), Stream Control Transmission Protocol (SCTP), HyperText Markup Language (HTML), and/or the like.

As will be appreciated, one or more of the management computing entity's components may be located remotely from other management computing entity 104a components, such as in a distributed system. Furthermore, one or more of the components may be aggregated and additional components performing functions described herein may be included in the management computing entity 104a.

User Computing Entity

Figure 3:
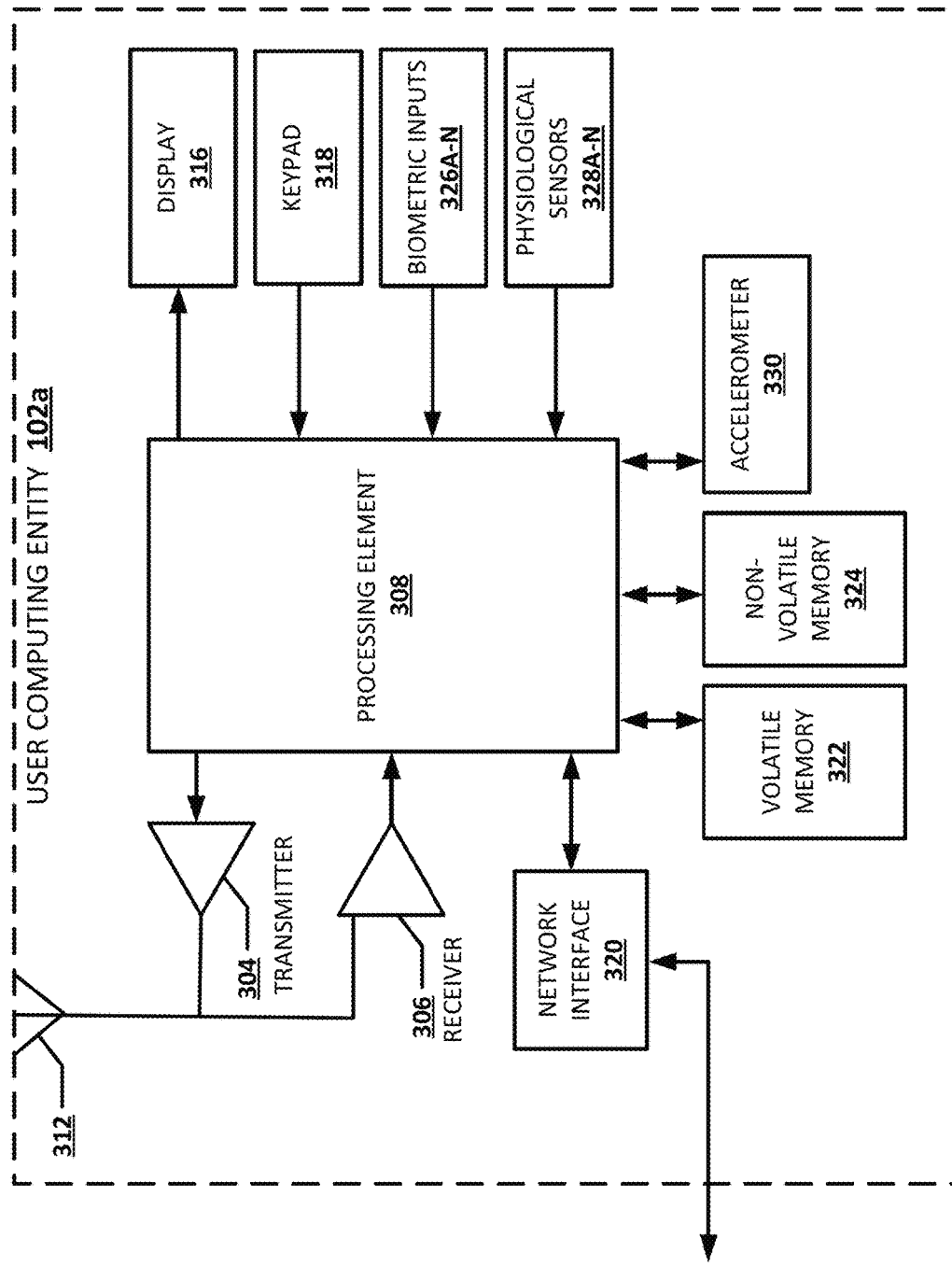
FIG. 3 is a schematic diagram of a user computing entity in accordance with certain embodiments of the present disclosure.

FIG. 3 is a schematic diagram of a user computing entity 102a in accordance with certain embodiments of the present disclosure. In various embodiments, the user computing entity 102a may include one or more computers, computing devices, computing entities, desktop computers, mobile phones, tablets, phablets, notebooks, laptops, mobile devices, wearable computing devices, and/or the like.

As shown in FIG. 3, n user computing entity 102a may include an antenna 312, a transmitter 304 (e.g., radio), a receiver 306 (e.g., radio), and a processing element 308 that provides signals to and receives signals from the transmitter 304 and receiver 306, respectively. The signals provided to and received from the transmitter 304 and the receiver 306, respectively, may include signaling information/data in accordance with an air interface standard of applicable wireless systems to communicate with various devices, such as a management computing entity 104a, another user computing entity 102a, and/or the like. In an example embodiment, the transmitter 304 and/or receiver 306 are configured to communicate via one or more SRC protocols. For example, the transmitter 304 and/or receiver 306 may be configured to transmit and/or receive information/data, transmissions, and/or the like of at least one of Bluetooth protocols, low energy Bluetooth protocols, NFC protocols, RFID protocols, IR protocols, Wi-Fi protocols, ZigBee protocols, ZWave protocols, 6LoWPAN protocols, and/or other short range communication protocol. In various embodiments, the antenna 312, transmitter 304, and receiver 306 may be configured to communicate via one or more long range protocols, such as GPRS, UMTS, CDMA200, 1×RTT, WCDMA, GSM, EDGE, TD-SCDMA, LTE, E-UTRAN, EVDO, HSPA, HSDPA, Wi-Fi, Wi-Fi Direct, WiMAX, and/or the like.

In this regard, the user computing entity 102a may be capable of operating with one or more air interface standards, communication protocols, modulation types, and access types. More particularly, the user computing entity 102a may operate in accordance with any of a number of wireless communication standards and protocols. In a particular embodiment, the user computing entity 102a may operate in accordance with multiple wireless communication standards and protocols, such as GPRS, UMTS, CDMA200, 1×RTT, WCDMA, TD-SCDMA, LTE, E-UTRAN, EVDO, HSPA, HSDPA, Wi-Fi, WiMAX, UWB, IR protocols, Bluetooth protocols, USB protocols, and/or any other wireless protocol.

Via these communication standards and protocols, the user computing entity 102a may communicate with various other devices using concepts such as Unstructured Supplementary Service information/data (USSD), Short Message Service (SMS), Multimedia Messaging Service (MMS), Dual-Tone Multi-Frequency Signaling (DTMF), and/or Subscriber Identity Module Dialer (SIM dialer). The user computing entity 102a may also download changes, add-ons, and updates, for instance, to its firmware, software (e.g., including executable instructions, applications, program modules), and operating system.

According to one embodiment, the user computing entity 102a may include location determining aspects, devices, modules, functionalities, and/or similar words used herein interchangeably to acquire location information/data regularly, continuously, or in response to certain triggers. For example, the user computing entity 102a may include outdoor positioning aspects, such as a location module adapted to acquire, for example, latitude, longitude, altitude, geocode, course, direction, heading, speed, UTC, date, and/or various other information/data. In one embodiment, the location module may acquire information/data, sometimes known as ephemeris information/data, by identifying the number of satellites in view and the relative positions of those satellites. The satellites may be a variety of different satellites, including LEO satellite systems, DOD satellite systems, the European Union Galileo positioning systems, the Chinese Compass navigation systems, Indian Regional Navigational satellite systems, and/or the like. Alternatively, the location information/data may be determined by triangulating the position of the user computing entity 102a in connection with a variety of other systems, including cellular towers, Wi-Fi access points, and/or the like. Similarly, the user computing entity 102a may include indoor positioning aspects, such as a location module adapted to acquire, for example, latitude, longitude, altitude, geocode, course, direction, heading, speed, time, date, and/or various other information/data. Some of the indoor aspects may use various position or location technologies including RFID tags, indoor beacons or transmitters, Wi-Fi access points, cellular towers, nearby computing entities (e.g., smartphones, laptops) and/or the like. For instance, such technologies may include iBeacons, Gimbal proximity beacons, BLE transmitters, NFC transmitters, and/or the like. These indoor positioning aspects may be used in a variety of settings to determine the location of someone or something to within inches or centimeters.

The user computing entity 102a may also include a user interface device comprising one or more user input/output interfaces (e.g., a display 316 and/or speaker/speaker driver coupled to a processing element 308 and a touch interface, keyboard, mouse, and/or microphone coupled to a processing element 308). For example, the user interface may be configured to provide an application (e.g., mobile app), browser, interactive user interface, dashboard, webpage, and/or similar words used herein interchangeably executing on and/or accessible via the user computing entity 102a to cause display or audible presentation of information/data and for user interaction therewith via one or more user input interfaces. In one embodiment, the functionality described herein (and user interface) may be provided as a standalone app executing on the user computing entity 102a. In such an implementation, the standalone app may be integrated with a variety of other apps executing on the user computing entity 102a to provide authentication functionality for other apps. Moreover, the user interface may include or be in communication with any of a number of devices allowing the user computing entity 102a to receive information/data, such as a keypad 318 (hard or soft), a touch display, voice/speech or motion interfaces, scanners, readers, or other input device. In embodiments including a keypad 318, the keypad 318 may include (or cause display of) the conventional numeric (0-9) and related keys (#, *), and other keys used for operating the user computing entity 102a and may include a full set of alphabetic keys or set of keys that may be activated to provide a full set of alphanumeric keys. In addition to providing input, the user input interface may be used, for example, to activate or deactivate certain functions, such as screen savers and/or sleep modes. Through such inputs, the user computing entity 102a may capture, collect, store information/data, user interaction/input, and/or the like.

In various example embodiments, the user computing entity 102a may include one or more biometric input components 326a-n (e.g., sensors, elements) for receiving or capturing biometric inputs or information/data (e.g., regularly, continuously, or in response to certain triggers). For example, the user computing entity 102a may include a touch sensitive region and/or display for capturing fingerprint scans, in an example embodiment. In another example, the user computing entity 102a may include cameras and/or image capturing devices for capturing images (e.g., image information/data) of an iris and/or face to determine blink rates or skin responses and/or detect coughing episodes. In another example, the user computing entity 102a may include microphones for capturing cough samples for cough detection and recognition. As should be understood, the user computing entity 102a may include various biometric input components 326a-n (e.g., sensors, elements) for receiving biometric input and information/data from a user. In various example embodiments, the user computing entity 102a may regularly, continuously, or in response to certain triggers capture such information/data (e.g., image information/data and/or biometric information/data).

In another example embodiment, the user computing entity 102a may include one or more physiological components 328a-n (e.g., sensors, elements) for capturing physiological inputs or information/data (e.g., regularly, continuously, or in response to certain triggers). For example, the user computing entity 102a may include microelectromechanical (MEMS) components, biological and chemical sensing components, electrocardiogram (ECG) components, electromyogram (EMG) components, electroencephalogram (EEG)-based neural sensing components, optical sensing components, electrical sensing components, sound components, vibration sensing components, and/or the like. Through such components, various types of physiological information/data may be captured-such as heart rate information/data, oxygen saturation information/data, carbon dioxide information/data, temperature information/data, breath rate information/data, perspiration information/data, neural information/data, cardiovascular sounds information/data, pulmonary sounds information/data, and/or various other types of information/data.

In another example embodiment, the user computing entity 102a may include one or more accelerometers, gyroscopes, and/or inertial measurement units (referred to herein separately and collectively as accelerometers 330) for capturing accelerometer information/data. For example, the accelerometers may capture static and dynamic acceleration, angular velocity, and degrees of freedom (DOF) to provide highly accurate orientation, position, and velocity information/data (e.g., accelerometer information/data).

The user computing entity 102a may also include volatile storage or memory 322 and/or non-volatile storage or memory 324, which may be embedded and/or may be removable. For example, the non-volatile memory may be ROM, PROM, EPROM, EEPROM, flash memory, MMCs, SD memory cards, Memory Sticks, CBRAM, PRAM, FeRAM, RRAM, SONOS, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. The volatile and non-volatile storage or memory may store databases, database instances, database management system entities, information/data, applications, programs, program modules, scripts, source code, object code, byte code, compiled code, interpreted code, machine code, executable instructions, and/or the like to implement the functions of the user computing entity 102a.

Networks

In one embodiment, any two or more of the illustrative components of the computing system 100 of FIG. 1 may be configured to communicate with one another via one or more networks 106. The networks 106 may include, but are not limited to, any one or a combination of different types of suitable communications networks such as cable networks, public networks (e.g., the Internet), private networks (e.g., frame-relay networks), wireless networks, cellular networks, telephone networks (e.g., a public switched telephone network), or any other suitable private and/or public networks. Further, the networks 106 may have any suitable communication range associated therewith and may include, for example, global networks (e.g., the Internet), MANS, WANS, LANs, or PANs. In addition, the networks 106 may include any type of medium over which network traffic may be carried including coaxial cable, twisted-pair wire, optical fiber, a hybrid fiber coaxial (HFC) medium, microwave terrestrial transceivers, radio frequency communication mediums, satellite communication mediums, or any combination thereof, as well as a variety of network devices and computing systems provided by network providers or other entities.

III. EXAMPLES OF CERTAIN TERMS

In some embodiments, the term "search query" refers to a data entity that describes a text-based search query for a search domain. A search query, for example, may include a structured and/or natural language sequence of text (e.g., one or more alphanumeric characters, symbols, etc.). In some examples, the search query may include user input, such as text input and/or text generated from one or more audio, tactile, and/or like inputs. In some examples, a search query may include a natural language sequence of text. In some examples, the natural language sequence of text may be associated with one or more contextual query attributes. The contextual query attributes, for example, may include a location attribute (e.g., a global positioning system (GPS) position, a latitude/longitude, etc.), one or more structured filters (e.g., selected categories, etc.), and/or the like. In some examples, the search query may include (i) a natural language sequence of text that expresses a question, preference, and/or the like and/or (ii) one or more contextual query attributes for constraining a result for the natural language sequence of text.

In some embodiments, the search query is based on a respective search domain or "target domain." For example, a search query for a clinical domain may include a natural language sequence of text to express a description of a medical condition and/or contextual query attributes, such as a location, member network, and/or the like that may constrain a recommendation for addressing the medical condition for a user. In some examples, a search query for a particular search domain may include one or more characteristics. As some examples, a search query may include a full word (e.g., "pediatrics" in a clinical domain) or a partial word (e.g., "pedi") text. In addition, or alternatively, the search queries may correspond to one or more different topics within a search domain, such as (i) clinical conditions (e.g., adhd, etc.), (ii) clinical specialties (e.g., urgent care, etc.), and (iii) clinical services (eye exam, etc.) in a clinical domain. In some examples, a search query may be constrained by factors that correspond to the particular search domain, such as network plans, healthcare providers, languages spoken by healthcare providers, a user's ability to travel for treatment, among other examples for a clinical domain. By way of example, keeping with the clinical example, a user may consider traveling 100 miles to have foot surgery but would not want their primary care provider to be more than 5 miles from their location.

In some embodiments, a search query is input to and/or processed by a search engine. For example, a user may be allowed to type in full words (e.g., "pediatrics gastroenterology" in a clinical domain), partial words (e.g., "joh") that may be autocompleted based on a respective autocomplete suggestion (e.g., as generated by a domain-aware autocomplete model), and/or the like into a search interface of the search engine. In response to the search query, the search engine may generate a plurality of comprehensive search results. For instance, using some of the techniques of the present disclosure, one or more domain-aware autocomplete functions may be applied to the search query intelligently autocomplete the search query with relevant data associated with a target domain (e.g., a particular clinical domain) related to the search query.

In some embodiments, the term "domain-aware autocomplete model" refers to a data entity that describes parameters, hyper-parameters, and/or defined operations of a rules-based and/or machine learning model (e.g., a model including at least one of one or more rule-based layers, one or more layers that depend on trained parameters, coefficients, and/or the like). A domain-aware autocomplete model may include one or more machine learning models configured, trained (e.g., jointly, separately, etc.), and/or the like to autocomplete a search query by automatically and intelligently generating autocomplete suggestions based on data associated with a target domain (e.g., a particular healthcare domain, etc.). A domain-aware autocomplete model may include one or more of any type of machine learning model including one or more supervised, unsupervised, semi-supervised, reinforcement learning models, and/or the like. In some examples, a domain-aware autocomplete model may include multiple models configured to perform one or more different stages of a generative language process. For example, a domain-aware autocomplete model may include, integrate with, embody, and/or employ one or more SRMs, rule-based weighted N-gram models, sentence classification models, neural language translation models, spellcheck models, and/or the like.

In some embodiments, a domain-aware autocomplete model is a generative machine learning model, such as a large language model (LLM), a natural language processing (NLP) model, and/or any other type of deep learning model. For example, a domain-aware autocomplete model may be a machine learning model configured to generate contextual autocomplete suggestions for a search query that is grounded by a particular search domain. In various embodiments, the domain-aware autocomplete model may be trained using an autocomplete suggestion training dataset comprising data associated with one or more target domain sources within a target domain. In various examples, the autocomplete suggestion training dataset may include text data from annotated HTML-based webpages associated with a particular target domain (e.g., website crawler data, data generated by a rule-based weighted N-gram model, etc.), one or more domain taxonomies (e.g., a group of classifications, categories, keywords, labels and/or the like associated with a particular domain), one or more domain keywords generated by a search editor, and/or one or more search queries generated by one or more end users.

In some embodiments, the term "query result data object" refers to a data entity that describes a potential search result generated by a search engine associated with a target domain. A query result data object, for example, may be indicative (e.g., include an entity identifier, textual description, etc.) of an entity that is associated with one or more portions of data associated with an organization, enterprise and/or individual associated with a target domain. By way of example, a query result data object may include a profile for an entity that includes a plurality of source features corresponding to the entity. The entity may depend on the search domain. As one example, in a clinical domain, an entity may be a healthcare provider (e.g., facility, practitioner, medical group, etc.) and the query result data object may include a provider profile identifying a plurality of source features corresponding to the healthcare provider. In some examples, the plurality of source features for a particular query result data object may be distributed across a plurality of different information channels.

In some embodiments, the term "search query resolution" refers to a data entity that describes one or more query result data objects corresponding to a search query. For example, a search query resolution may identify one or more query result data objects (and/or one or more source features thereof) for a search query. A query resolution, for example, may identify one or more query result data objects for a search query based on an autocomplete suggestion generated by a domain-aware autocomplete model. By way of example, the query resolution may include one or more query result data objects that correspond to one or more portions of data related to a target domain source (e.g., a website associated with a particular clinical provider).

In some embodiments, the term "source feature" refers to a data entity that describes a characteristic corresponding to one or more potential search results of a search domain. A source feature, for example, may be indicative (e.g., include an attribute identifier, textual description, etc.) of an attribute that may be associated with one or more query result data objects. For instance, a source feature may include an object-specific source feature that correspond to a single query result data object (e.g., a unique name, precise location, etc.). In various embodiments, an autocomplete suggestion generated by a domain-aware autocomplete model may be associated with a respective source feature.

In addition, or alternatively, a source feature may include an object-generic source feature (e.g., a general location, a specialty, an activity frequency, etc.). In some examples, the object-generic source features (and/or the object-specific source features) may be based on a search domain. By way of example, a clinical domain may include a plurality of source features that describe one or more taxonomy codes (e.g., clinical specialties, etc.), assessment codes (e.g., ICD codes, etc.), intervention codes (e.g., CPT codes, etc.), and/or the like that may be associated with one or more of a plurality of query result data objects within a search domain.

In some embodiments, the term "source text attribute" refers to an attribute of a source feature represented as one or more characters (e.g., alphanumeric, numeric, alphabetic, etc.). For example, a source text attribute may include a numeric, alpha-numeric, and/or the like code (e.g., taxonomy code, ICD code, CPT code, etc.) that corresponds to a source feature. In addition, or alternatively, a source text attribute may include a textual description that corresponds to the source feature (e.g., a taxonomy description, code description, etc.). In various embodiments, an autocomplete suggestion generated by a domain-aware autocomplete model may be associated with a respective source text attribute.

In some embodiments, the term "source embedding attribute" refers to an attribute of a source feature represented as a numerical vector. For example, a source embedding attribute may include an embedded representation of a source text attribute and/or contextual information for the source text attribute. In some examples, a source embedding attribute may be generated, using an SRM, for one or more of the source features to complement a source text attribute in a multi-modal search environment. In various embodiments, an autocomplete suggestion generated by a domain-aware autocomplete model may be associated with a respective source embedding attribute.

In some embodiments, the term "rule-based weighted N-gram model" refers to a data entity that describes parameters, hyper-parameters, and/or defined operations of a rules-based and/or machine learning model (e.g., model including at least one of one or more rule-based layers, one or more layers that depend on trained parameters, coefficients, and/or the like). A rule-based weighted N-gram model may include one or more machine learning models configured, trained (e.g., jointly, separately, etc.), and/or the like to annotate one or more target domain sources by encoding textual data into one or more embeddings. In some embodiments, a rule-based, weighted N-gram model is configured to annotate and/or assign an importance score and/or a rank to one or more given terms on a webpage related to a respective organization, enterprise and/or individual associated with a target domain. In various embodiments, based on respective weights, importance scores, and/or ranks associated with the one or more terms, the one or more terms may be used by a domain-aware autocomplete model as respective autocomplete suggestions for completing a search query being input into a search-engine by an end user. A rule-based weighted N-gram model may include one or more of any type of machine learning model including one or more supervised, unsupervised, semi-supervised, reinforcement learning models, and/or the like. In some examples, a rule-based weighted N-gram model may include multiple models configured to perform one or more different stages of an annotation and/or embedding process.

In some embodiments, the term "suggestion recognition model (SRM)" refers to a data entity that describes parameters, hyper-parameters, and/or defined operations of a rules-based and/or machine learning model (e.g., model including at least one of one or more rule-based layers, one or more layers that depend on trained parameters, coefficients, and/or the like). An SRM may include one or more machine learning models configured, trained (e.g., jointly, separately, etc.), and/or the like to extract, detect, and/or otherwise determine that one or more autocomplete suggestions are associated with one or more target domain sources. An SRM may include one or more of any type of machine learning model including one or more supervised, unsupervised, semi-supervised, reinforcement learning models, and/or the like. In some examples, an SRM may include multiple models configured to perform one or more different stages of an annotation and/or embedding process (e.g., an annotation and/or embedding process executed in conjunction with a rule-based weighted N-gram model associated with a domain-aware autocomplete model).

In some embodiments, an SRM is trained using one or more supervised training techniques. Additionally or alternatively, an SRM is trained based on one or more portions of model output generated by a rule-based weighted N-gram model configured to assign various weights to one or more portions of textual data associated with one or more respective HTML tags related to one or more target domain sources. In some examples, an SRM may be trained to factorize one or more inputs, such as one or more text strings, to generate an embedded vector. In some examples, an SRM may be trained such that the model's latent space is representative of certain semantic domains/contexts, such as a clinical domain. For example, an SRM may be trained to generate embeddings representative of one or more learned (and/or prescribed, etc.) relationships between one or more words, phrases, and/or sentences. By way of example, an SRM may represent a semantic meaning of a word and/or sentence differently in relation to other words and/or sentences, and/or the like. Furthermore, an SRM may generate one or more labels used to annotate one or more terms and/or portions of text extracted, detected, and/or otherwise determined to be associated with a particular target domain source. The SRM may include any type of embedding model finetuned on information for a particular search domain. By way of example, an SRM may include one or more of SBERT, ClinicalBERT, BERT, Word2Vec, GloVe, Doc2Vec, InferSent, Universal Sentence Encoder, and/or the like.

In some embodiments, the term "keyword representation" refers to a text-based representation of an autocomplete suggestion. For example, a keyword representation may include a plurality of text units from a textual sequence extracted, detected, and/or otherwise determined to be associated with a particular target domain source. The text units, for example, may include a plurality of keywords extracted (e.g., by an SRM, etc.) from the textual sequence associated with the particular target domain source. By way of example, a keyword representation may include the plurality of extracted keywords.

In some embodiments, the term "embedding representation" refers to a vector-based representation (e.g., an associated label) of an autocomplete suggestion that has been extracted, detected, and/or otherwise determined to be associated with a particular target domain source. For example, an embedding representation may include an embedded vector from a textual sequence associated with an autocomplete suggestion. The embedding representation, for example, may include an embedding vector (e.g., numeric vector, etc.) that captures a semantic and/or contextual meaning of an autocomplete suggestion. By way of example, an embedding representation may be generated by processing a target webpage associated with a target domain with an SRM.

IV. OVERVIEW

Embodiments of the present disclosure present text interpretation techniques that improve computer interpretation and intent prediction of search queries with respect to traditional search and/or autocomplete search engines. For example, autocomplete search engines may be embedded in webpages and/or or other software applications related to various scientific and/or technological fields such as patient-facing web-portals in the healthcare domain. By doing so, an autocomplete search engine may be leveraged to limit a user's search query to one of a set of autocomplete, or "type-ahead," suggestions that are relevant to a particular website or software application. In this way, embedded autocomplete search engines may reduce null search results that are often generated from a free-text search query input by an end user.

Traditional autocomplete solutions are static and may employ a limited set of vocabulary for generating autocomplete suggestions. Such autocomplete solutions may not have capabilities for generating relevant autocomplete suggestions for a search engine based on metadata (e.g., public knowledge sources, user behavior data, target domains related to specific scientific and/or technological fields, etc.). As such, traditional autocomplete solutions may not be capable of inferring the intent of a search query input by an end user in order to generate relevant search results (e.g., to find relevant pages on a particular website, etc.). For example, in the context of a healthcare insurance domain, traditional search engines need to know if "dental cleaning" belongs to "benefit," "provider," and/or other categories in order to find relevant webpages detailing whether dental cleaning is covered for a member or whether the intention of the end user was to find nearby dentists who perform dental cleanings.

Previous techniques employed user query logs aggregated over a predefined period to extract autocomplete suggestions and build an autocomplete vocabulary. However, such techniques result in autocomplete suggestions that are incorrectly spelled, inconsistent, and/or offer a low variety (e.g., present the same autocomplete suggestion in different tenses), redundant, and/or the like set of results. Such autocomplete suggestions are also a poor predictor of the current data available on a respective website. For example, null search results generated based on search queries made in the past may no longer be null today or, alternatively, valid search results generated based on search queries made in the past may nevertheless result in null results based on the current data associated with the respective website.

In addition to the above deficiencies, traditional search engines are limited to a generic search domain with limited flexibility to account for a variety of organizations, enterprises and/or individuals across various medical, scientific, technological, and/or business fields. Accounting for the various nuances of each domain requires a different set of autocomplete suggestions based on different domain data related to the various fields. The process of collecting such data may be time-consuming and computationally expensive, and therefore limits the scalability and adaptivity of the autocomplete solutions for new organizations, enterprises and/or individuals. Because generating autocomplete suggestions is only one (and usually the first) step of an end user search query, it is desirable that the autocomplete solution is fast (e.g., less than 20 ms) while still generating a variety of relevant suggestions at runtime.

To address these technological challenges and more, some embodiments of the present disclosure provide a domain-aware autocomplete model that (i) is aware of the content and data that is currently available related to a particular organization, enterprise, and/or individual associated with a respective target domain (e.g., a healthcare insurance website), (ii) may adapt to changes quickly (e.g., website reconfigurations, software application re-factorings, datastore updates, etc.), and (iii) is trained on sufficient data to produce relevancy for any type of back-end search engine associated with the particular organization, enterprise, and/or individual related to the target domain. Some embodiments of the present disclosure are adaptable to any type of content related to any target domain and are quickly scalable and/or be customizable to new and/or existing organizations, enterprises, and/or individuals without adversely impacting the relevancy of any search results generated based on the autocomplete suggestions and/or type-ahead suggestions provided by the domain-aware autocomplete model.

In some scenarios, a respective organization, enterprise, and/or individual associated with a respective target domain (e.g., a healthcare insurance website) may not be aware of the content and/or data that is available (or may no longer be available) on a respective website and/or software application associated with the respective organization, enterprise, and/or individual. To address this type of technological issue, embodiments are configured to find, receive, and/or retrieve autocomplete suggestions from various target domain sources associated with the respective organization, enterprise, and/or individual. Target domain sources include various websites, domain taxonomies (e.g., existing domain-specific taxonomies generated by domain experts and/or search editors), user query logs (e.g., past and/or current user queries executed with respect to a particular website), and/or domain keyword lists (e.g., created by stakeholders, search editors, and/or domain experts) associated with the respective organization, enterprise, and/or individual.

Once embodiments have generated, aggregated, and/or otherwise compiled a set of autocomplete suggestions from one or more target domain sources, the autocomplete suggestions may be ranked based on relevancy. Inventors have found that the best sources of autocomplete suggestions are the webpages that are currently available on a target website associated with the respective organization, enterprise, and/or individual. While the content of a webpage may be easily "crawled" (e.g., collected) and/or parsed using available software tools, extracting autocomplete suggestions from a webpage is a technologically difficult task. To address this problem, embodiments are configured to employ a rule-based weighted N-gram model to determine which sentences, words, and/or other data on a webpage are the most important and/or most relevant for generating autocomplete suggestions. In various embodiments, based on respective weights, importance scores, and/or ranks associated with the one or more terms, the one or more terms may be used by the domain-aware autocomplete model as respective autocomplete suggestions for completing a search query being input into a search-engine by an end user.

In various embodiments, the domain-aware autocomplete model is a supervised or partially-supervised machine learning (ML) model. Furthermore, in various embodiments, the domain-aware autocomplete model is a multi-modal ML model that embodies, integrates with, and/or otherwise employs one or more other ML models configured to perform the various methods described herein (e.g., such as the aforementioned rule-based weighted N-gram model).

Examples of technologically advantageous embodiments of the present disclosure include: (i) a plurality of specially designed ML models to detect, parse, weight, score and/or rank potential autocomplete suggestions from one or more target domain sources, (ii) a domain-aware autocomplete model configured to (a) to be aware of the content and data that is currently available related to a particular organization, enterprise, and/or individual associated with a respective target domain (e.g., a healthcare insurance website), (b) to adapt to changes quickly (e.g., website reconfigurations, software application re-factorings, datastore updates, etc.), and (c) be trained on sufficient data to produce relevancy for any type of back-end search engine associated with the particular organization, enterprise, and/or individual related to the target domain, (iii) a domain-aware autocomplete model that is further configured to generate autocomplete suggestions based on one or more portions of user search query text data, where the autocomplete suggestions may be employed to generate relevant search results by a search engine, (iv) a domain-aware autocomplete model that is further configured to be customizable by particular organization, enterprise, and/or individual in order to quickly adapt to a particular target domain associated with the particular organization, enterprise, and/or individual, and (v) a domain-aware autocomplete model that is further configured to be language agnostic and/or multilingual such that the domain-aware autocomplete model may generate autocomplete suggestions based on end user search queries associated with various languages. Other technical improvements and advantages may be realized by one of ordinary skill in the art.

It should be appreciated that while specific examples given with regard to the various embodiments described herein may pertain to one or more clinical domains, medical domains, healthcare domains and/or insurance domains, persons of ordinary skill in that art will realize that the methods associated with the embodiments described herein could be effectively applied to one or more engineering domains, aerospace domains, industrial domains, petrochemical domains, agricultural domains, educational domains, and/or any other relevant, complex scientific and/or technological domain. Furthermore, embodiments described herein may also be applicable to model-based summarization technologies, model-based analysis technologies, and model-based suggestion and/or recommendation technologies.

V. EXAMPLE SYSTEM OPERATIONS

As indicated, various embodiments of the present disclosure make important technical contributions to search query autocomplete technology. In particular, systems and methods are disclosed herein that implement a domain-aware autocomplete model in order to generate relevant and appropriate autocomplete suggestions based on a target domain associated with a respective organization, enterprise, and/or individual. The autocomplete suggestions may be tagged, using a combination of a hybrid-labeling pipeline and manual overrides, to generate suggestion-category pairs (SCP). The SCPs allow a search engine to selectively boost or hide certain categories given feedback over time allowing for increased relevancy that adapts to changing environments. Moreover, the SCPs allow clients to intelligently direct users to pages within a searchable domain, thereby reducing the number of clicks and sequences of interactions required to reach a final landing page desired by both a client surfacing information and a user requesting the information.

Unlike traditional autocomplete techniques, some of the techniques of the present disclosure provide an adaptable, customizable, and multi-lingual autocomplete solution tailored to the respective organization, enterprise, and/or individual associated with the corresponding target domain. By doing so, search results may be generated that capture the underlying intent behind search queries in complex search domains, while ensuring the search results are verifiable, contextual, and appropriate. Meanwhile, by providing tailored, domain-aware autocomplete suggestions based on a search query input by an end user, the techniques of the present disclosure may improve both the accuracy and relevancy of search query resolutions initiated based on an autocomplete suggestion generated by the domain-aware autocomplete model.

FIGS. 4-10 illustrate example data structures, modules, and operations related to the methods and techniques detailed herein. Although FIGS. 4-10 may depict a particular sequence of steps/operations and/or dataflows, the sequence may be altered without departing from the scope of the present disclosure. For example, some of the steps/operations and/or dataflows depicted in FIGS. 4-10 may be performed in parallel or in a different sequence that does not materially impact the functionalities described by the FIGS. 4-10. Additionally or alternatively, the FIGS. 4-10 may describe one or more steps/operations and/or dataflows that are a part of a process and/or a sub-process related to the methods described herein. In some examples, different components of an example device, system, and/or module that implements the steps/operations and/or dataflows depicted in FIGS. 4-10 may perform functions at substantially the same time or in a specific sequence. In various examples, the example data structures, modules, and operations depicted in FIGS. 4-10 may be associated with and/or performed by the components of the computing system 100 (e.g., the user computing entities 102*a-n* and/or the management computing entities 104-*n*).

Figure 4:
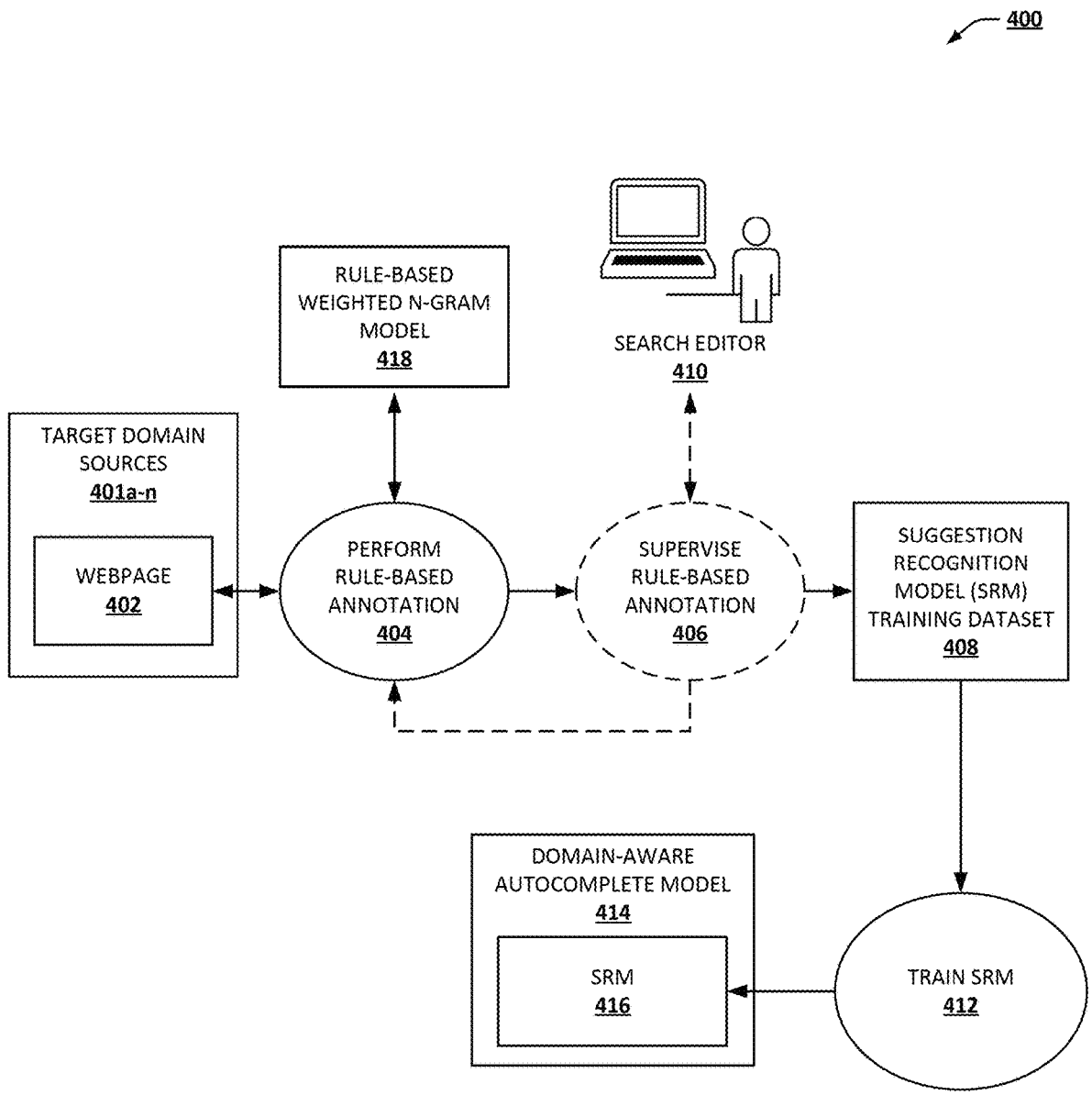
FIG. 4 is a dataflow diagram showing example data structures, modules, and operations for performing a rule-based annotation associated with a target domain source in accordance with some embodiments discussed herein.

FIG. 4 is a dataflow diagram 400 showing example data structures, modules, and operations for performing a rule-based annotation associated with a target domain source in accordance with some embodiments discussed herein. Specifically, FIG. 4 illustrates that embodiments are configured to perform rule-based annotation (e.g., as illustrated by operation 404) on one or more target domain sources 401*a-n*. For example, one or more target domain sources 401*a-n* within a target domain such as may include text data from an annotated HTML-based webpage 402 associated with a particular target domain. In various examples, the target domain sources 401*a-n* may include one or more domain taxonomies (e.g., a group of classifications, categories, keywords, labels and/or the like associated with a particular domain), one or more domain keywords generated by a search editor, and/or one or more search queries generated by one or more end users.

At operation 404, embodiments are configured to perform rule-based annotation on the webpage 402. In this regard, embodiments may employ a rule-based weighted N-gram model 418 to crawl, parse, and/or otherwise extract autocomplete suggestions from the webpage 402. The rule-based weighted N-gram model 418 may include a series of rules configured to annotate the webpage 402 and/or extract autocomplete suggestions from text associated with various HTML tags. While raw text from a webpage may not indicate the importance of a corresponding term displayed on the webpage, various HTML tags included within the source code of the webpage associated with the raw text do. For example, a respective term may be tagged via HTML as a title rather than body content, or a respective term may be tagged via HTML as bold or underlined. Such HTML tags are signals that indicate the importance of a respective term in a webpage.

In various embodiments, the rule-based weighted N-gram model 418 embodies, employs, and/or is otherwise associated with a rule-based and/or ML-based website crawler configured to extract, annotate, parse, and/or otherwise detect the one or more given terms and/or HTML tags associated with the one or more given terms on a webpage 402. As such, in some embodiments, the rule-based weighted N-gram model 418 may be configured to generate one or more portions of website crawler data including the one or more given terms on the webpage 402. In various embodiments, based on respective weights, importance scores, and/or ranks associated with the one or more terms, the one or more terms may be used by the domain-aware autocomplete model 414 as respective autocomplete suggestions for completing a search query being input into a search-engine by an end user.

As described herein, the rule-based weighted N-gram model 418 may be configured to assign a weight to the autocomplete suggestions based on the various HTML tags associated with the text on the webpage 402. For example, the rule-based weighted N-gram model 418 may assign a high weight to the text "Ophthalmologist" associated with an HTML tag indicating the text is a title. Similarly, the rule-based weighted N-gram model 418 may assign a high weight to the text "eye doctor" associated with an HTML tag indicating the text is emboldened and/or italicized. As another example, the rule-based weighted N-gram model 418 may assign a medium weight to the text "When should you go?" associated with an HTML tag indicating the text is a heading. As yet another example, the rule-based weighted N-gram model 418 may assign a low weight to text on the webpage 402 associated with an HTML tag indicating the text is body content.

Operation 406 describes that, in various examples, a search editor 410 (e.g., a human in the loop) may supervise the rule-based annotation of the webpage 402. In various examples, once one or more webpages 402 related to a target website associated with a respective organization, enterprise, and/or individual related to a target domain are crawled, parsed, and/or annotated by the rule-based weighted N-gram model 418 associated with the domain-aware autocomplete model 414, a sample of the webpages 402 is sent to a search editor 410 (e.g., a "human in the loop" such as an administrator, software developer, and/or the like). The search editor 410 may adjust the weights of the annotated terms and/or update various ML rules associated with the rule-based weighted N-gram model 418 in order to get desired autocomplete suggestions from a respective webpage 402. For example, the search editor 410 may manually annotate a portion of text "chiropractor" as having a high weight even if "chiropractor" originally appeared amongst text associated with an HTML tag indicating "chiropractor" was body content and, therefore, had been assigned a low weight by the rule-based weighted N-gram model 418.

These annotated webpages 402 are then used to train a suggestion recognition model (SRM) 416 associated with the domain-aware autocomplete model 414 that utilizes embeddings and word sequences on the webpages to detect the annotated suggestions. After training the SRM 416, the SRM 416 is employed to detect important, potential autocomplete suggestions on new webpages 402 automatically, generalizing to other ML rules that may not have been considered previously. This is an iterative process in which the ML rules, the search editor 410 (e.g., the human in the loop), and the various models associated with the domain-aware autocomplete model 414 continuously provide feedback to each other in order to better refine the quality of the autocomplete suggestions generated by the domain-aware autocomplete model 414.

In various examples, an initial ranking, weighting, and/or scoring of an autocomplete suggestion depends on how frequently the autocomplete suggestion appears in an autocomplete suggestion corpus associated with a respective organization, enterprise, and/or individual related to a target domain, the location of the autocomplete suggestion within a webpage 402, and/or the HTML tags associated with a term associated with the autocomplete suggestion. However, as described herein, the respective organization, enterprise, individual and/or search editor 410 have the ability to change the ranking of autocomplete suggestions based on a particular need. In this regard, the domain-aware autocomplete model 414 provides the technological benefit of being customizable instead of being a "black box" ML model that cannot be fine-tuned to meet the needs of a particular organization, enterprise, and/or individual.

Once a predetermined number of webpages 402 have been annotated via the rule-based weighted N-gram model 418 and manually verified by the search editor 410, the annotated webpages 402 may be aggregated in a suggestion recognition model (SRM) training dataset 408. As shown in FIG. 4, operation 412 describes that an SRM 416 associated with a domain-aware autocomplete model 414 is trained based on the SRM training dataset 408. In various embodiments, the SRM 416 is trained to extract, detect, and/or otherwise determine one or more autocomplete suggestions associated with a respective webpage (e.g. webpage 402) related to a particular target domain. The SRM 416 may be configured to process the content of a webpage in such a way as to keep track of the position of one or more portions of text (e.g., keyword representations) on a webpage along with the corresponding HTML tags associated with the one or more portions of text. For example, the SRM 416 can, in some embodiments, generate output related to a respective webpage that is configured as follows:

<title> Ophthalmologist <! title>
    <heading> When should you go? <!heading>
    <content> While it . . . an <bold> eye doctor
        <!bold> . . . <!content>Based on the example output provided above, the SRM 416 may determine, based on the HTML tags, that the most relevant autocomplete suggestions associated with the respective webpage are "Ophthalmologist," and "eye doctor."

Furthermore, in various embodiments, the SRM 416 may be trained to tokenize the model output and may generate one or more tokens associated with the positions and/or HTML tags associated with the text that was processed on the respective webpage. For example, "<title> Ophthalmologist<!title>" may be tokenized as "10024 61022," and "<content> . . . <bold> Ophthalmologist !<bold> . . . <!content>" may be tokenized as "10022 423 61022", where "10024" indicates an HTML tag associated with a title, "10022" indicates an HTML tag associated with body content, "423" indicates an HTML tag associated with a bold text format, and "61022" indicates the autocomplete suggestion "Ophthalmologist."

Additionally, in various embodiments, the SRM 416 is configured to generate a label for a respective autocomplete suggestion based on the tokenized model output. In various examples, a label associated with an autocomplete suggestion may be configured as a sparse vector (e.g., an embedding representation) indicating a category the autocomplete suggestion belongs to, as well as a position in the tokenized model output the autocomplete suggestion is associated with. In keeping with the example provided above, a label associated with the autocomplete suggestion may be configured as the sparse vector "{0:43, 323:43}," where "0" and "323" represent the indices associated with the tokenized model output where "Ophthalmologist" was extracted from, and where "43" represents an associated category such as "provider." In various embodiments, the category (e.g., "provider") associated with the autocomplete suggestion may indicate and/or be associated with a class (e.g., a programming data construct) that the autocomplete suggestion belongs to.

Figure 5:
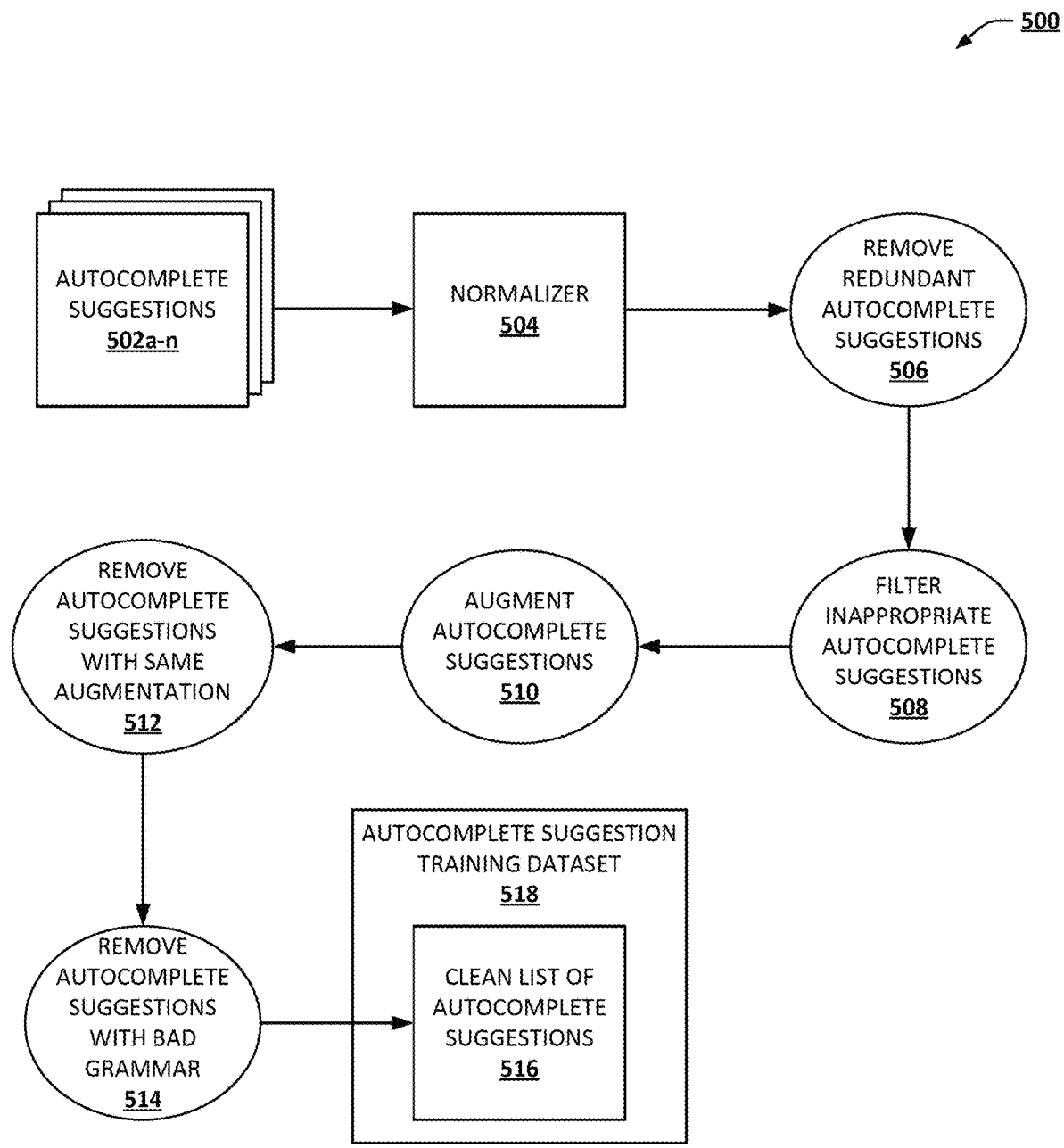
FIG. 5 is a dataflow diagram showing example data structures, modules, and operations for generating a clean list of autocomplete suggestions for an autocomplete suggestion training dataset in accordance with some embodiments discussed herein.

FIG. 5 is a dataflow diagram 500 showing example data structures, modules, and operations for generating a clean list of autocomplete suggestions 516 for an autocomplete suggestion training dataset 518 in accordance with some embodiments discussed herein. Specifically, FIG. illustrates how various embodiments are configured to employ a normalizer 504 in order to generate a clean list of autocomplete suggestions 516 based on one or more autocomplete suggestions 502a-n, where the clean list of autocomplete suggestions 516 is associated with a particular organization, enterprise and/or individual related to a respective target domain. As shown in FIG. 5, a series of post-processing steps are performed on the one or more autocomplete suggestions 502a-to in order to reduce redundancies and/or filter one or more inappropriate autocomplete suggestions included in the autocomplete suggestions 502a-n. In some examples, the one or more autocomplete suggestions 502an are obtained from a target domain source 401a (e.g., a webpage 402). For example, in some embodiments, the autocomplete suggestions 502a-n are extracted, detected, and/or otherwise determined to be associated with the target domain source 401a by an SRM 416 associated with a domain-aware autocomplete model 414.

In certain scenarios, the autocomplete suggestions 502a-n extracted by the SRM 416 may contain non-obvious, redundant autocomplete suggestions. In some examples, redundant autocomplete suggestions may include a same word stem. As described by operation 506, these non-obvious, redundant suggestions may be removed and/or aggregated by the normalizer 504 before being compiled in the autocomplete suggestion training dataset 518 for training the domain-aware autocomplete model 414. Alternatively, in some embodiments, these non-obvious, redundant suggestions may be aggregated by the normalizer 504a at run-time as the domain-aware autocomplete model 414 generates autocomplete suggestions based on a search query input by an end user. For example, the autocomplete suggestions "eye doctor" and "eye doctors" are considered redundant. As another example, "dentist close by," "dentist nearby," and/or "dentists close to me" are also considered redundant and/or associated with the same intent.

In addition to containing non-obvious, redundant autocomplete suggestions, one or more of the autocomplete suggestions 502a-n may be inappropriate, considered offensive, and/or deemed to be off-brand. As such, at operation 508, the normalizer 504 is configured to filter (e.g., remove, delete, relocate, etc.) one or more inappropriate autocomplete suggestions from the one or more autocomplete suggestions 502a-n. In various embodiments, the normalizer 504 may be customized based on one or more user preferences associated with the organization, enterprise and/or individual associated with the computing system 100.

At operation 510, the normalizer 504 may be configured to augment one or more autocomplete suggestions 502a-n. In various examples, the one or more autocomplete suggestions 502a-n may be augmented based on the method executed during operations 506-508. In various other embodiments, the one or more autocomplete suggestions 502a-n may be augmented based on the target domain and/or target domain sources associated with the organization, enterprise and/or individual associated with the computing system 100. For example, the normalizer 504 may augment the one or more autocomplete suggestions 502a-n based on one or more common or preferred spellings (e.g., British English versus American English spellings), use cases, standards, and/or regulations associated with the target domain and/or target domain sources. At operation 512, the normalizer 504 may be configured to remove (e.g., delete) any autocomplete suggestions 502a-n that were augmented in a same and/or similar manner during operation 510, thus further reducing any redundancies in the one or more autocomplete suggestions 502a-n.

At operation 514, the normalizer 504 may be configured to remove any autocomplete suggestions 502a-n associated with bad grammar and/or misspellings. By the end of the series of post-processing steps, the normalizer 504 will have generated a clean list of autocomplete suggestions 516. In various embodiments, the clean list of autocomplete suggestions 516 may be stored as part of the autocomplete suggestion training dataset 518. In one or more embodiments, the one or more management computing entities 104a-n may employ the autocomplete suggestion training dataset 518 to train, re-train, and/or otherwise update a respective domain-aware autocomplete model 414. In various embodiments, the autocomplete suggestion training dataset 518 may embody, integrate with, and/or otherwise be associated with an autocomplete suggestion corpus associated with a respective organization, enterprise, and/or individual related to a target domain.

Figure 6:
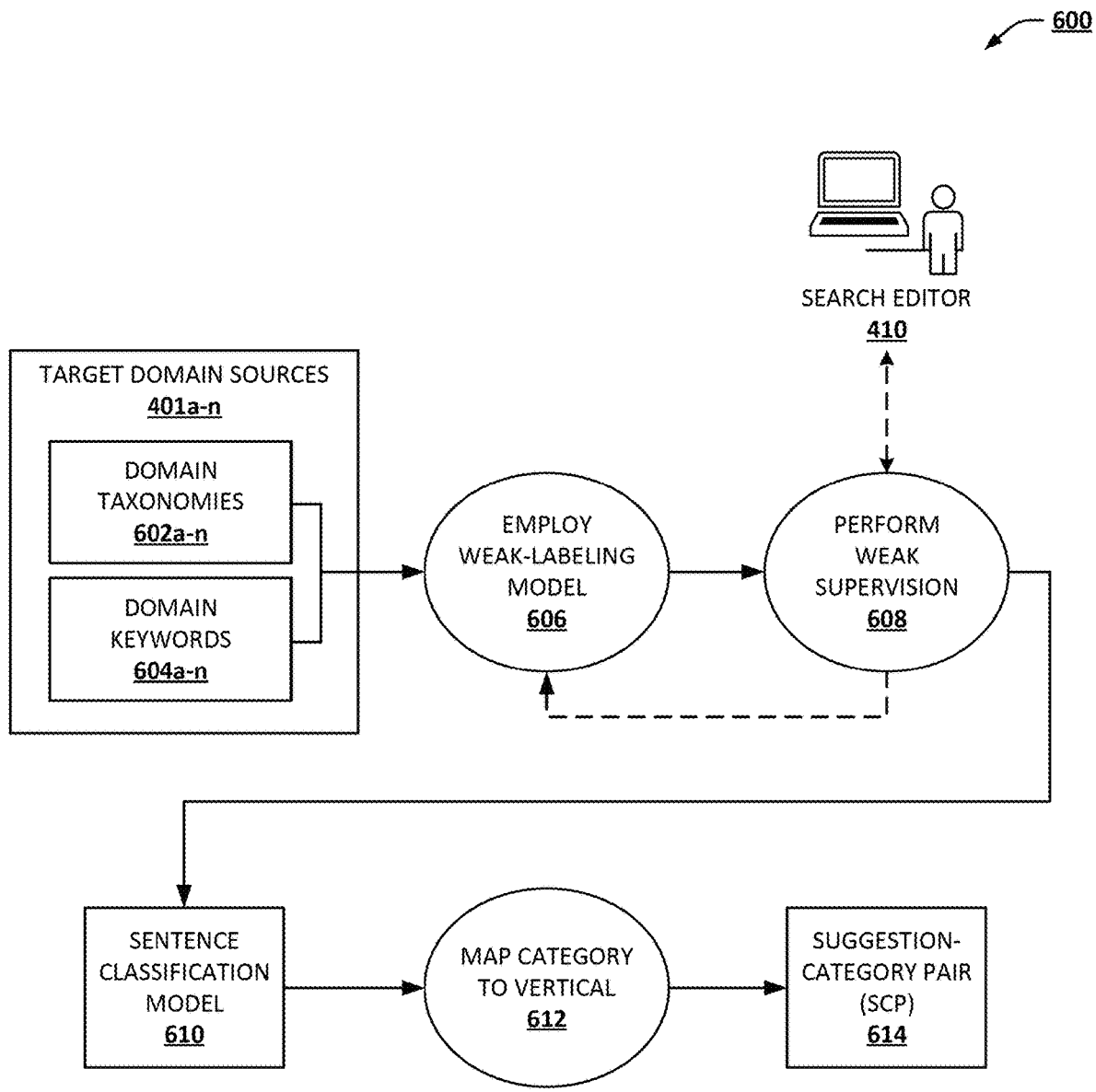
FIG. 6 is a dataflow diagram showing example data structures, modules, and operations for generating a suggestion-category pair (SCP) in accordance with some embodiments discussed herein.

FIG. 6 is a dataflow diagram showing example data structures, modules, and operations for generating a suggestion-category pair (SCP) in accordance with some embodiments discussed herein. Specifically, FIG. 6 illustrates a hybrid labeling pipeline 600 associated with one or more embodiments described herein. In various examples, once a clean list of autocomplete suggestions 516 has been generated for a particular organization, enterprise and/or individual related to a respective target domain, each autocomplete suggestion included in the clean list of autocomplete suggestions 516 may be associated (e.g., tagged) with a particular category in order to assist an existing search engine associated with the particular organization, enterprise and/or individual to better index their corpus (e.g., a collection of webpages associated with a particular website). As such, a suggestion-category pair (SCP) 616 associated with a particular autocomplete suggestion and a respective category related to a particular vertical (e.g., a business vertical associated with the organization, enterprise and/or individual related to the respective target domain) may be generated by the domain-aware autocomplete model 414.

In some embodiments, an SCP is generated based on a predefined category mapping and/or a hybrid-labeling pipeline. For example, an autocomplete suggestion may be compared to a query lookup table to identify a category for an SCP. The query lookup table, for example, May include a plurality of predefined autocomplete suggestions corresponding to one or more distinct sets of mappings previously recorded for a set of autocomplete suggestions. Each mapping may include a category corresponding to a predefined autocomplete suggestion. In the event that a particular autocomplete suggestion is identified in the query lookup table, the corresponding category may be instantly returned, bypassing the hybrid-labeling pipeline described herein. In some manner, a query lookup table may be leveraged as an exception handler for a subset of predefined autocomplete suggestions that may reduce the runtime for common queries and allows for specific category overrides the category for any given query.

In various embodiments, in addition to one or more portions of text data from an annotated HTML-based webpage 402, the target domain sources 401a-n may include one or more domain taxonomies 602a-n, one or more domain keywords 604a-n generated by a search editor, and/or one or more search queries generated by one or more end users. In order to ensure that embodiments described herein are scalable for any organization, enterprise, and/or individual related to the target domain, embodiments employ the hybrid labeling pipeline in which autocomplete suggestions (e.g., autocomplete suggestions 502a-n) are first labeled using the domain taxonomies 602a-n and/or predetermined domain keywords 604a-n developed by one or more search editors 410.

At operation 606, a weak-labeling model is then employed in conjunction with weak-supervision techniques performed in operation 608 to decorrelate the domain taxonomies 602a-n and/or domain keywords 604a-n across different classes. The resulting, updated labeled data is then fed to a sentence classification model 610 (e.g., a skip-gram model) associated with the domain-aware autocomplete model 414 which assigns one or more category tags to each autocomplete suggestion.

In some examples, a plurality of category tags may be assigned to a single autocomplete suggestion, such that an autocomplete suggestion may have a one to many relationship with a plurality of category tags. Each category tag may correspond to a metric, attribute, characteristic, and/or the like that is associated with a one or more autocomplete suggestions. In some examples, the category tags for an autocomplete suggestion may be leveraged to rank the autocomplete suggestion (e.g., relative to other tagged suggestions) with respect to the circumstances associated with a search.

At operation 612, the resulting updated label (e.g., a taxonomy label) may then be mapped to multiple business verticals for different organizations, enterprises, and/or individuals associated with various target domains. Example business verticals may be associated with specific markets and/or fields associated with various sectors including the healthcare industry, insurance industry, aerospace industry, agriculture industry, chemical manufacturing industry, defense industry, energy production and distribution industry, real estate industry, and transportation industry. Each of the aforementioned sectors may be further narrowed down to a discrete business vertical related to the domain of the sector, such as dentistry or optometry in the healthcare industry, and may be associated with a plurality of categories, topics, keywords, taxonomies, data, domain knowledge, and/or the like.

This allows an organization, enterprise, and/or individual to correctly route an end user to a relevant webpage and/or software application module based on search queries completed by a respective autocomplete suggestions generated by the domain-aware autocomplete model 414. Furthermore, as a result of the hybrid labeling pipeline, an SCP 614 associated with a particular autocomplete suggestion and a respective category related to a particular vertical (e.g., a business vertical associated with the organization, enterprise and/or individual related to the respective target domain) may be generated by the domain-aware autocomplete model 414. The resulting SCP 614 may be employed by a respective search engine associated with the organization, enterprise and/or individual related to the respective target domain to initiate performance of a search query resolution. This allows an organization, enterprise, and/or individual to correctly route an end user to a relevant webpage and/or software application module based on search queries completed by a respective autocomplete suggestions generated by the domain-aware autocomplete model 414.

Figure 7:
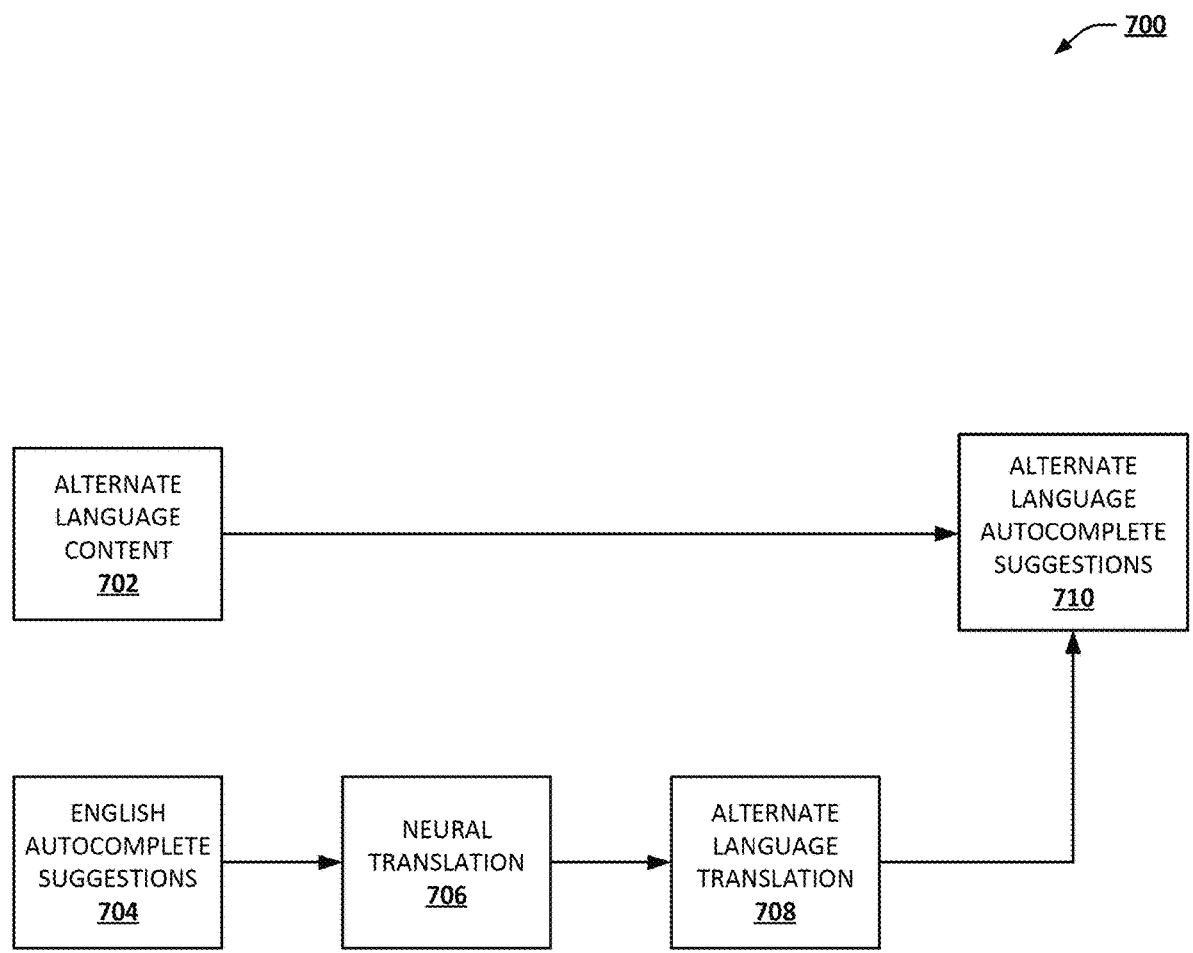
FIG. 7 is a dataflow diagram showing example data structures, modules, and operations for generating alternate language autocomplete suggestions in accordance with some embodiments discussed herein.

FIG. 7 is a dataflow diagram 700 showing example data structures, modules, and operations for generating alternate language autocomplete suggestions 710 in accordance with some embodiments discussed herein. It will be appreciated that the domain-aware autocomplete model may be configured to be multilingual such that the domain-aware autocomplete model 414 may generate autocomplete suggestions in various languages. For example, one or more Spanish-language webpages may be crawled and/or parsed to extract Spanish content and/or data from the one or more Spanish-language webpages. Furthermore, embodiments may be configured to employ a neural language translation model 706 to translate a list of autocomplete suggestions and/or associated categories to an alternate language (e.g., Spanish). This enables the domain-aware autocomplete model 414 to be language agnostic and multi-lingual, as the domain-aware autocomplete model 414 may generate autocomplete suggestions and/or corresponding tags for any content in any language.

For example, as depicted in FIG. 7, one or more alternate language webpages (e.g., Spanish language webpages) may be crawled and/or parsed to extract, detect, and/or otherwise determine alternate language content 702 associated with the one or more alternate language webpages. Furthermore, various embodiments may be configured to employ the neural language translation model 706 to translate a list of English autocomplete suggestions 704 to an alternate language (e.g., Spanish) in order to generate an alternate language translation 708. The various translated autocomplete suggestions included in the alternate language translation 708 may then be ranked and/or categorized in the alternate language using the same modules and/or components associated with the domain-aware autocomplete model 414 that are described herein. As such, the domain-aware autocomplete model 414 is language agnostic and multi-lingual, and the domain-aware autocomplete model 414 may generate alternate language autocomplete suggestions 710 and/or corresponding tags for any content associated with a respective target domain in any language.

Figure 8:
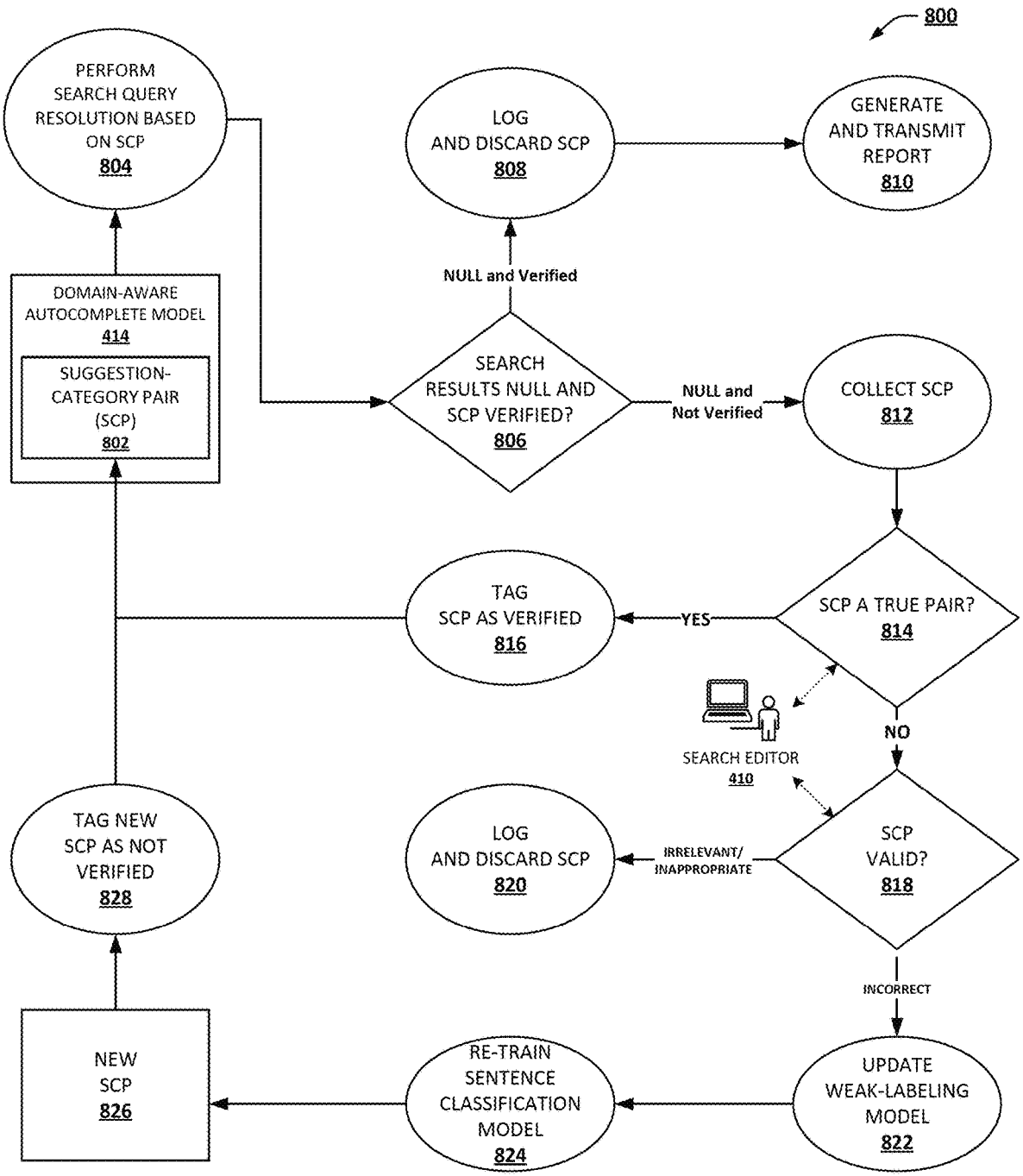
FIG. 8 is a dataflow diagram showing example data structures, modules, and operations for an SCP verification loop in accordance with some embodiments discussed herein.

FIG. 8 is a dataflow diagram showing example data structures, modules, and operations for an SCP verification loop 800 in accordance with some embodiments discussed herein. Specifically, FIG. 8 depicts how a domain-aware autocomplete model 414 passes an SCP 802 to an existing search engine (e.g., a back-end search engine associated with a respective organization, enterprise and/or individual related to the respective target domain). At operation 804, a search query resolution is performed based on the SCP 802. At operation 806, it is determined whether the search results are null results (e.g., a query result data object associated with the search query has a null value and/or no data) and whether the SCP 802 has been tagged as verified (e.g., by a search editor 410). If it is determined that the search results are null results and that the SCP 802 has been tagged as verified, the SCP verification loop 800 proceeds to operation 808 in which the SCP 802 is logged (e.g., stored in a datastore associated with the computing system 100) and discarded by domain-aware autocomplete model 414 so that the SCP 802 will not be used during subsequent search queries performed by an end user. Furthermore, at operation 810, the domain-aware autocomplete model 414 generates a report detailing that the verified SCP 802 produced null search results and causes transmission of the report to one or more management computing entities 104a-n associated with the computing system 100.

However, if it is determined the search results generated based on the SCP 802 are null results (e.g., a query result data object associated with the search query has a null value and/or no data) and that the SCP 802 has not been tagged as verified, the SCP verification loop 800 proceeds to operation 812 in which the SCP 802 is collected and sent to a respective search editor 410 for verification. At operation 814, it is determined whether the SCP 802 is a true pair such that the autocomplete suggestions associated with the SCP 802 is accurately and/or correctly matched to a respective category associated with the SCP 802. If the SCP 802 is determined to be a true pair, the SCP verification loop 800 proceeds to operation 816 in which the SCP 802 is tagged as verified such that it may be used again by the domain-aware autocomplete model 414 in subsequent search queries. In a subsequent SCP verification loop 800, any SCPs 802 tagged as verified that still return null search results are removed from the autocomplete suggestion corpus and logged. In various examples, this is an indication that the search engine is not able to return relevant webpages and a further inspection of the back-end content or indices is required.

If the SCP 802 is determined not to be a true pair, the SCP verification loop 800 proceeds to operation 818 in which it is determined whether the SCP 802 is valid. At operation 818, if it is determined that the SCP 802 is inappropriate and/or irrelevant, the SCP verification loop 800 proceeds to operation 820 in which the SCP 802 is logged, marked for removal, and removed from the autocomplete suggestion corpus. Alternatively, if the SCP 802 is determined to be incorrect, the SCP verification loop 800 proceeds to operation 822. At operation 822, the search editor 410 may manually correct (e.g., update) the SCP 802 and/or update (e.g., initiate re-training) the weak-labeling model associated with the hybrid labeling pipeline. This action, in some embodiments, also triggers operation 824 in which the sentence classification model associated with the hybrid labeling pipeline is also updated and/or re-trained. As a result of operations 822 and 824, a new SCP 826 is generated by the domain-aware autocomplete model 414 and, at operation 828, is automatically tagged as not verified before being added to the autocomplete suggestion corpus.

Figure 9:
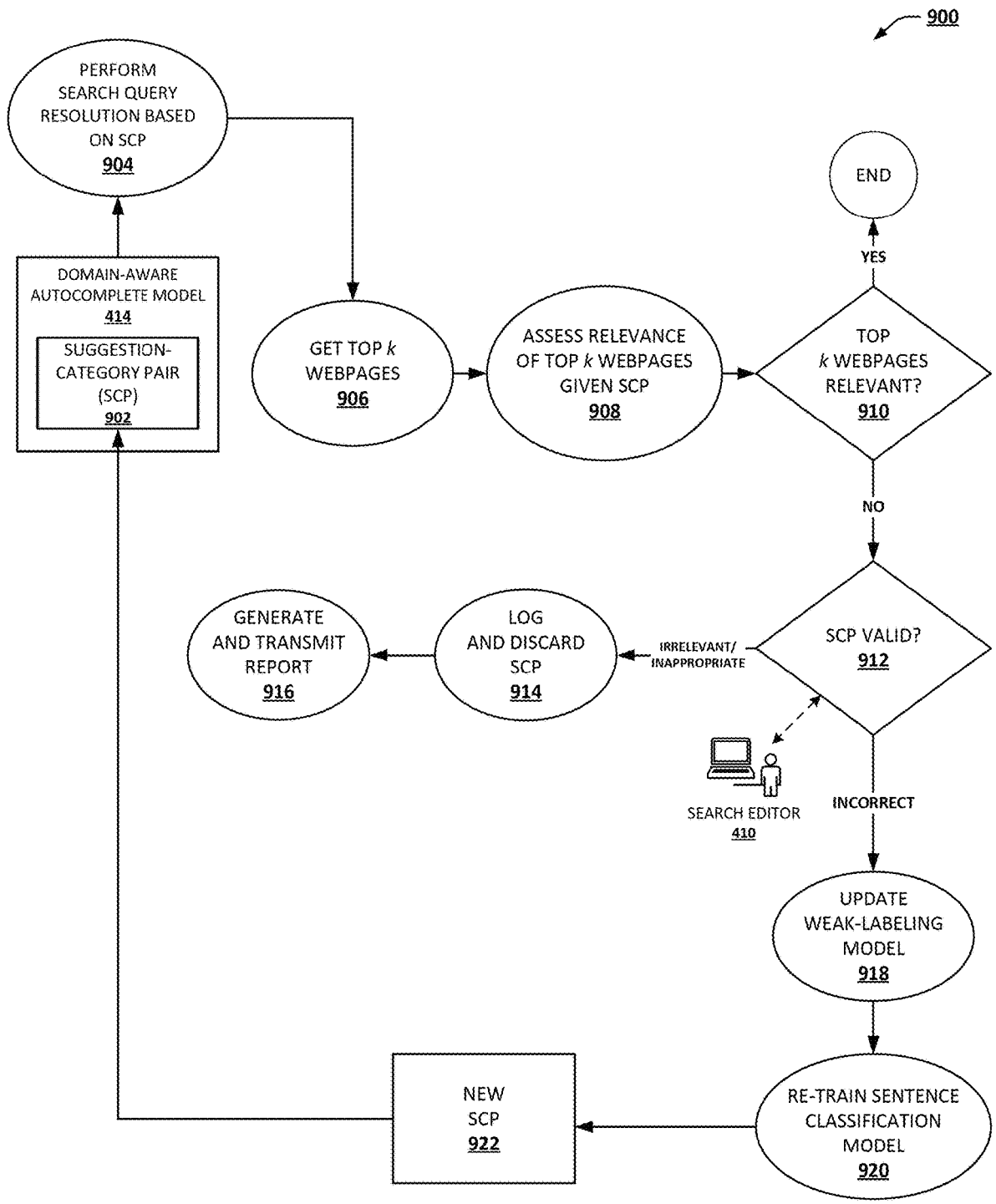
FIG. 9 is a dataflow diagram showing example data structures, modules, and operations for assessing the relevancy associated with a respective SCP in accordance with some embodiments discussed herein.

FIG. 9 is a dataflow diagram showing example data structures, modules, and operations related to a process 900 for assessing the relevancy associated with a respective SCP 902 in accordance with some embodiments discussed herein. At operation 904, a domain-aware autocomplete model 414 passes an SCP 902 to an existing search engine (e.g., a back-end search engine associated with a respective organization, enterprise and/or individual related to the respective target domain) and a search query resolution is performed based on the SCP 902. In addition to determining whether search results generated based on the SCP 902 are null results (e.g., as detailed in FIG. 8), the domain-aware autocomplete model 414 is configured to, as shown in operation 906, obtain the top k webpages (e.g., top three webpages) associated with the search results generated based on the search query resolution associated with the SCP 902.

At operation 908, the domain-aware autocomplete model 414 assesses the relevance of the top k webpages for the given SCP 902. In some embodiments, the domain-aware autocomplete model 414 determines the relevance of the top k webpages based on one or more source text attributes and/or source embedding attributes associated with one or more respective source features associated with a query result data object related to the search query resolution performed based on the SCP 802. As such, the domain-aware autocomplete model 414 may determine a relevancy score related to the top k webpages associated with the search results generated based on the search query resolution performed based on the SCP 802.

At operation 910, the domain-aware autocomplete model 414 determines if the relevancy score associated with the top k webpages satisfies (e.g., meets or exceeds) a predetermined relevancy threshold. If the relevancy score satisfies the predetermined relevancy threshold, the process 900 ends. However, if the relevancy score does not satisfy the predetermined relevancy threshold, the process 900 proceeds to operation 912.

At operation 912, the SCP 902 as well as a sample of the top k webpages comprising indexed data related to the top k webpages are sent to a search editor 410 for verification. If it is determined that the SCP 902 is inappropriate and/or irrelevant, the process 900 proceeds to operation 914 in which the SCP 902 is logged, marked for removal, and removed from the autocomplete suggestion corpus. Then, at operation 916, a report detailing that the SCP 902 is inappropriate and/or irrelevant is generated and transmitted to one or more management computing entities 104a-n associated with the computing system 100.

Alternatively, if the SCP 902 is determined to be incorrect (e.g., the SCP 902 is tagged with an incorrect category), the process 900 proceeds to operation 918. At operation 918, the search editor 410 may manually correct (e.g., update) the SCP 902 and/or update (e.g., initiate re-training) the weak-labeling model associated with the hybrid labeling pipeline. This action, in some embodiments, also triggers operation 920 in which the sentence classification model associated with the hybrid labeling pipeline is also updated and/or re-trained. As a result of operations 918 and 920, a new SCP 922 is generated by the domain-aware autocomplete model 414 and added to the autocomplete suggestion corpus.

Figure 10:
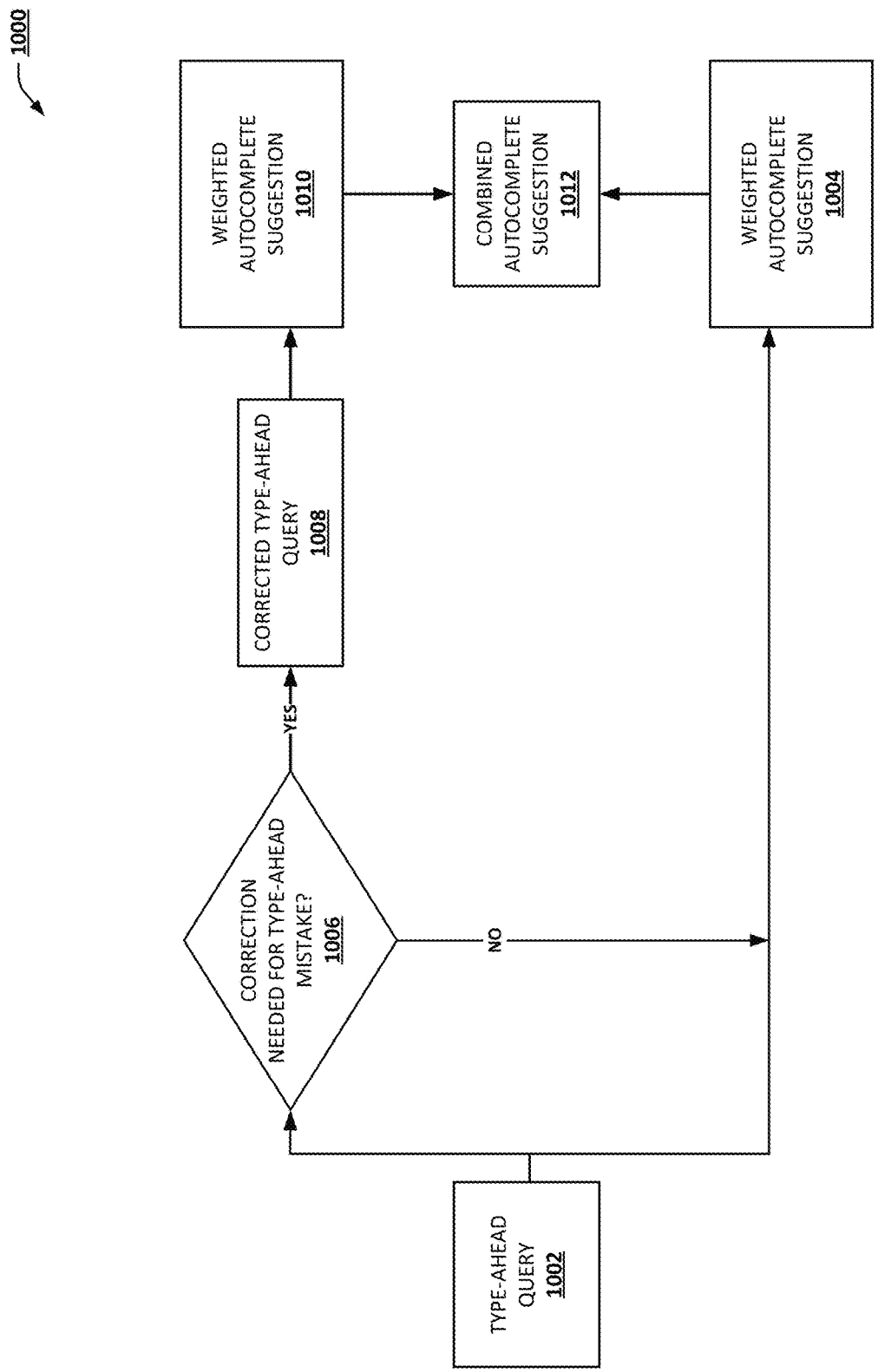
FIG. 10 is a dataflow diagram showing example data structures, modules, and operations for generating a combined autocomplete suggestion to mitigate search query spelling errors in accordance with some embodiments discussed herein.

FIG. 10 is a dataflow diagram 1000 showing example data structures, modules, and operations for generating a combined autocomplete suggestion to mitigate search query spelling errors in accordance with some embodiments discussed herein. As described herein, new trends in autocomplete-driven search practices disallow an end user to perform "text-free" searches (e.g., execute search query resolutions based on manually entered text input). To address these technological limitations, the domain-aware autocomplete model 414 is configured to generate autocomplete suggestions for type-ahead queries 1002 (e.g., search query text input entered into a search tool by an end user) that are commonly misspelled and/or mistyped.

At operation 1006, the domain-aware autocomplete model 414 determines whether the type-ahead query 1002 has been misspelled and that a correction is needed. In various embodiments, the domain-aware autocomplete model 414 may employ a spellcheck model trained based on a target domain and/or one or more target domain sources to correct type-ahead queries 1002 that have been misspelled. The spellcheck model may also be configured to generate a corrected type-ahead query 1008 based on the type-ahead query 1002 that was misspelled.

As shown in FIG. 10, the domain-aware autocomplete model 414 may generate weighted autocomplete suggestions based on the type-ahead query 1002 input by an end user. For example, the domain-aware autocomplete model 414 may generate a weighted autocomplete suggestion 1004 associated with a weight W1 based on the type-ahead query 1002 that was originally input by the end user. Additionally, the domain-aware autocomplete model 414 may generate weighted autocomplete suggestions based on the corrected type-ahead query 1008. For example, the domain-aware autocomplete model 414 may generate a weighted autocomplete suggestion 1010 associated with a weight W2 based on the corrected type-ahead query 1008 that was generated by the spellcheck model. In this regard, the domain-aware autocomplete model 414 is configured to generate a combined autocomplete suggestion 1012 based on the weighted autocomplete suggestion 1004 and the weighted autocomplete suggestion 1010.

In some examples, the combined autocomplete suggestion 1012 correlates to a weighted autocomplete suggestion associated with a higher weight such as the weighted autocomplete suggestion 1010 associated with the weight W2 that was generated based on the corrected type-ahead query 1008. In other examples, the combined autocomplete suggestion 1012 may include multiple autocomplete suggestions generated based on both the weighted autocomplete suggestion 1004 and the weighted autocomplete suggestion 1010.

In various embodiments, the spellcheck model associated with the domain-aware autocomplete model may be trained and/or re-trained based on various search query logs associated with a target domain source (e.g., a target website) associated with a respective organization, enterprise and/or individual associated with a target domain. In various examples, the search query logs may include a plurality of search queries input by one or more end users, where one or more search queriers of the plurality of search queries may be misspelled. For example, in various embodiments, the spellcheck model may parse the search query logs to determine if a corrections are needed for misspelled search queries. As the spellcheck model detects misspelled search queries, the spellcheck model may be configured to determine a longest "sub-word" (e.g., word stem, text fragment, etc.) between commonly misspelled words and the associated correctly spelled words. For example, the spellcheck model may be configured to determine a longest sub-word (e.g., "Ophthal") associated with the incorrectly spelled "Optomologist" and the correctly spelled "Ophthalmologist." In various embodiments, the spellcheck model is configured to generate a type-ahead correction dictionary comprising dictionary data objects related to the most commonly misspelled type-ahead queries. In keeping with the above example, the spellcheck model may generate a dictionary data object "Opto: Ophthal" that may be used for generating corrected type-ahead queries 1008 when type-ahead mistakes are detected while an end user is inputting a type-ahead query 1002 into a search engine.

Figure 11:
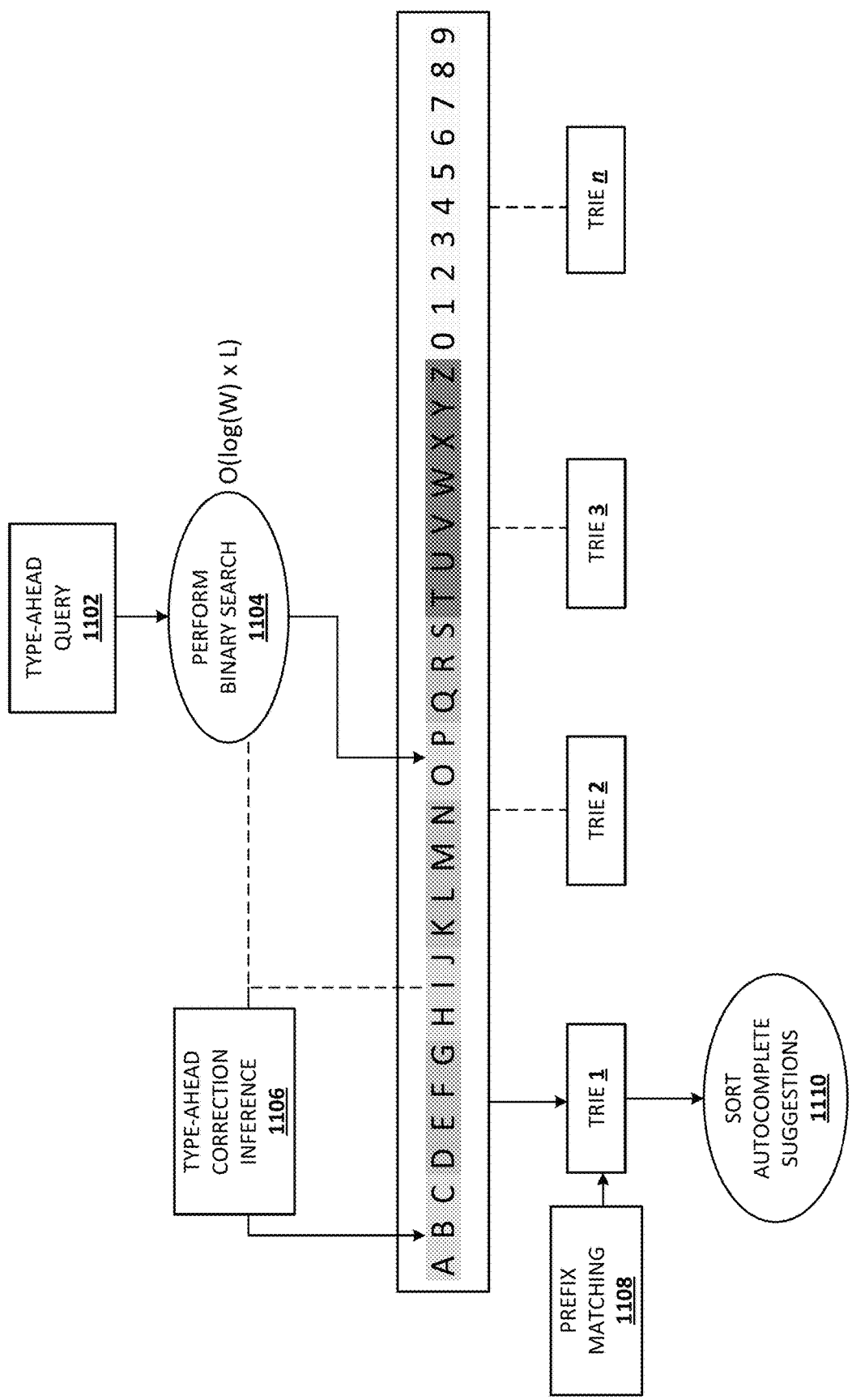
FIG. 11 is a dataflow diagram showing example data structures, modules, and operations for performing binary searches by a domain-aware autocomplete model in accordance with some embodiments discussed herein.

FIG. 11 is a dataflow diagram showing example data structures, modules, and operations for performing binary searches by a domain-aware autocomplete model 414 in accordance with some embodiments discussed herein. In various embodiments, the domain-aware autocomplete model is constructed based on a modified "trie" data structure (e.g., a prefix tree). In such a structure, the nodes prefix tree are text strings. Traversing (e.g., searching) a trie data structure is associated with a linear time complexity, which may be defined in "Big O" notation as $O(W \times L)$, where W is the number of strings and L is the length of the prefix associated with the strings. The search process may be sped up by performing a binary search, which may be defined in Big O notation as $O(\log(W))$. Introducing the binary search brings down the time complexity to $O(\log(W) \times L)$. Reducing the time complexity enables various embodiments to allocate separate computational resources for a group of words such that the autocomplete functionalities of the domain-aware autocomplete model 414 may be parallelized.

As depicted in FIG. 11, this parallelization is done in such a way that the type-ahead correction inference 1106 executed during the performance of a binary search (e.g., associated with operation 1104) based on a type-ahead query 1102 is done on the same trie (e.g., trie 1) as the type-ahead query 1102. Prefix matching 1108 is also performed on the same trie and, at operation 1110, the one or more autocomplete suggestions generated based on the performance of the binary search are sorted. In various examples, the autocomplete suggestions are sorted based on a frequency of offline insertion associated with the respective autocomplete suggestions (e.g., insertion into various keyword lists, category lists, and/or autocomplete suggestions corpuses by a search editor 410). The autocomplete suggestions may also be sorted and/or weighted based on whether they are associated with an original type-ahead query and/or a corrected type-ahead query.

In various embodiments, the domain-aware autocomplete model 414 may be customized to suit the preferences and/or needs of a respective organization, enterprise, and/or individual associated with a target domain. In various examples, the domain-aware autocomplete model 414 may be customized at run-time via a payload (e.g., a payload sent by a management computing entity) or offline using a configuration file. For example, a respective organization, enterprise, and/or individual may direct the domain-aware autocomplete model 414 to generate autocomplete suggestions associated with a particular intent or containing certain keywords. Additionally or alternatively, the respective organization, enterprise, and/or individual associated with the target domain may direct the domain-aware autocomplete model 414 to remove a group of autocomplete suggestions from an associated autocomplete suggestion corpus. Additionally or alternatively, the respective organization, enterprise, and/or individual associated with the target domain may direct the domain-aware autocomplete model 414 to assign priority to various respective autocomplete suggestions such that the respective autocomplete suggestions are displayed in a place of higher prominence relative to other autocomplete suggestions when displayed to an end user. In various embodiments, the domain-aware autocomplete model 414 may be configured to filter, demote, and/or promote various autocomplete suggestions included in a respective autocomplete suggestion corpus based on a predetermined list of keyword and/or categories defined by a search editor associated with the respective organization, enterprise, and/or individual.

Furthermore, the domain-aware autocomplete model 414 may be personalized and configured to filter, demote, and/or promote various autocomplete suggestions based on a user profile associated with a particular end user inputting a search query/type-ahead query into a respective search engine. In one or more embodiments, the user profile associated with the particular end user may define an eligibility of the end user (e.g., a medical benefit eligibility) and, as such, the domain-aware autocomplete model 414 may be configured to filter, demote, and/or promote various autocomplete suggestions based on the eligibility of the particular end user. For example, if the user profile associated with the particular end user defines that the end user is not eligible for dental care benefits, one or more autocomplete suggestions tagged with a category associated with dental care may be demoted (e.g., displayed in a place of low prominence) and/or filtered out by the domain-aware autocomplete model 414 at runtime.

Additionally or alternatively, the user profile associated with the particular end user may define a history of the end user (e.g., a medical history) and, as such, the domain-aware autocomplete model 414 may be personalized and configured to filter, demote, and/or promote various autocomplete suggestions based on the history of the particular end user. For example, if the end user has been associated with a particular category of medical provider (e.g., orthopedic providers) in the past, one or more autocomplete suggestions tagged with a category associated with the particular category of medical provider may be promoted (e.g., displayed in a place of high prominence) by the domain-aware autocomplete model 414 at runtime.

Figure 12:
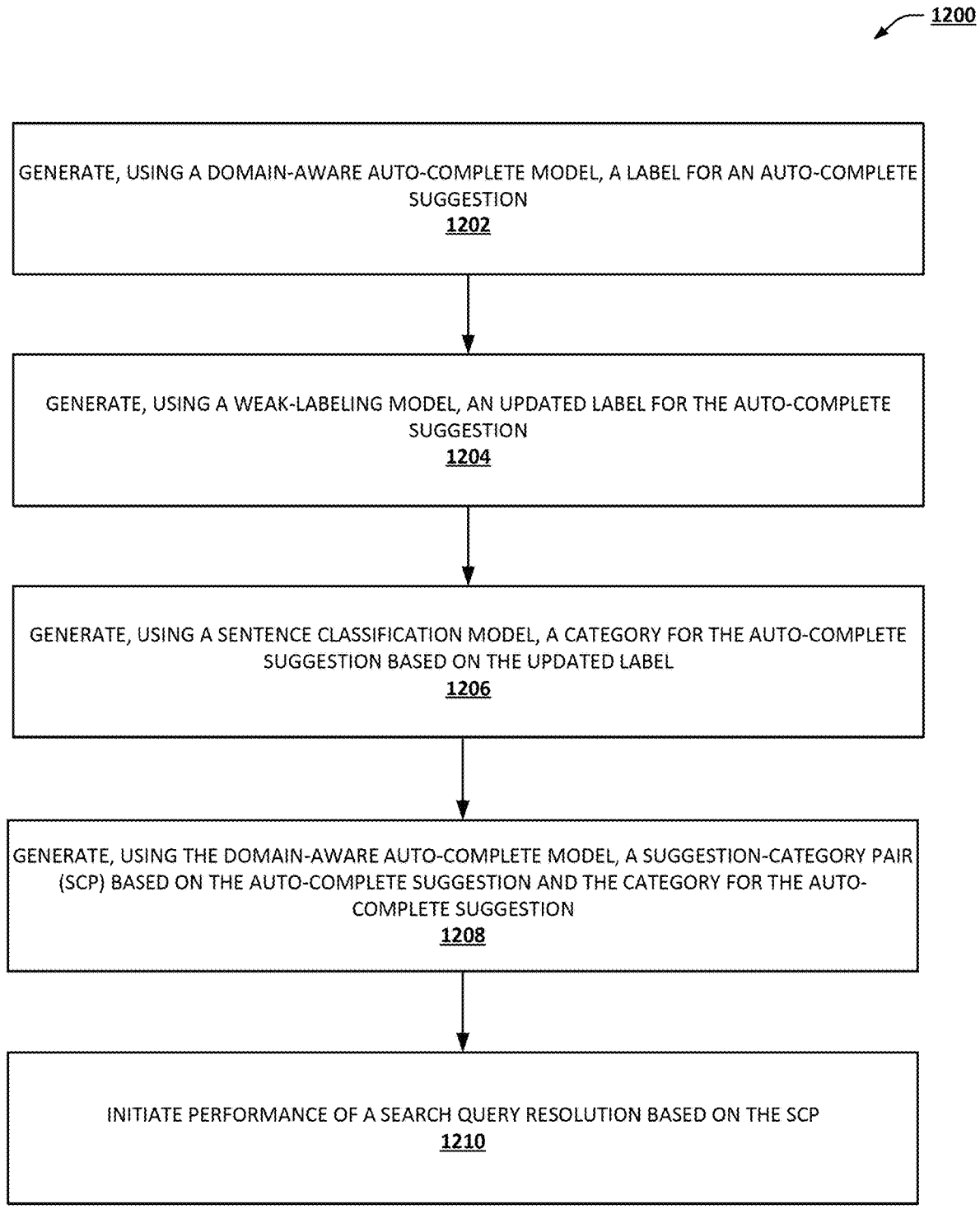
FIG. 12 is a flowchart showing an example of a process for providing domain-aware autocomplete in accordance with some embodiments discussed herein.

FIG. 12 is a flowchart showing an example of a process 1200 for providing domain-aware autocomplete suggestions in accordance with some embodiments discussed herein. The process 1200 may be implemented by one or more computing devices, entities, and/or systems described herein. For example, via the various steps/operations of the process 1200, the various components of the computing system 100, such as the user computing entities 102*a-n* and/or the management computing entity 104*a*, may leverage improved domain-aware autocomplete solutions for a respective target domain in order to generate relevant search results based on an autocomplete suggestion generated by a domain-aware autocomplete model. In this regard, the computing system 100 may generate, refine, and leverage a domain-aware autocomplete model 414 to provide improvements over traditional text interpretation techniques that enable learnable auto-complete suggestions that are tailored to a particular domain, thereby improving search resolution accuracy and reliability, while reducing processing resource usage and null search results with respect to traditional techniques.

FIG. 12 illustrates an example process 1200 for explanatory purposes. Although the example process 1200 depicts a particular sequence of steps/operations, the sequence may be altered without departing from the scope of the present disclosure. For example, some of the steps/operations depicted may be performed in parallel or in a different sequence that does not materially impact the function of the process 1200. In other examples, different components of an example device or system that implements the process 1200 may perform functions at substantially the same time or in a specific sequence.

In some embodiments, the process 1200 includes, at step/operation 1202, generating a label for an autocomplete suggestion. For example, a computing system 100 may generate, using a domain-aware autocomplete model, a label for an autocomplete suggestion based on a set of keywords within an autocomplete suggestion training dataset 518 associated with a target domain source. In various embodiments, the autocomplete suggestion training dataset 518 is associated with one or more target domain sources 401*a-n* within a target domain and the set of keywords comprised in the autocomplete suggestion training dataset 518 is associated with at least one of a domain taxonomy 602*a* or a set of domain keywords 604*a-n* generated by a search editor 410.

Additionally or alternatively, as described herein, the autocomplete suggestion training dataset 518 may include at least one portion of website crawler data (e.g., associated with a webpage 402), taxonomy data, user query data, or keyword data associated with one or more target domain sources within a target domain. In various examples, the website crawler data is retrieved by at least one of a rules-based website crawler or a machine learning model based website crawler. Furthermore, in one or more embodiments, the autocomplete suggestion training dataset 518 may be translated into an alternate language via a neural language translation model 706. As such, the domain-aware autocomplete model 414 may be configured (e.g., trained) to generate one or more autocomplete suggestions in the alternate language.

In some embodiments, the process 1200 includes, at step/operation 1204, generating, using a weak-labeling model, an updated label for the autocomplete suggestion. For example, the computing system 100 may generate, using a weak-labeling model, an updated label for the autocomplete suggestion by decorrelating the set of keywords from the label.

In some embodiments, the process 1200 includes, at step/operation 1206, generating, using a sentence classification model 610, a category for the autocomplete suggestion. For example, the computing system 100 may generate, using a sentence classification model 610, a category for the autocomplete suggestion based on the updated label. Additionally, the updated label associated with the autocomplete suggestion may be mapped to a business vertical associated with a particular enterprise related to a target domain.

In some embodiments, the process 1200 includes, at step/operation 1208, generating, using the domain-aware autocomplete model, a suggestion-category pair (SCP). For example, the computing system 100 may generate, using the domain-aware autocomplete model, an SCP (e.g., an SCP 802) based on the autocomplete suggestion and the category for the autocomplete suggestion.

In some embodiments, the process 1200 includes, at step/operation 1210, initiating performance of a search query resolution based on the SCP. For example, the computing system 100 may initiate performance of the search query resolution via a respective search engine associated with an organization, enterprise, and/or individual associated with a target domain based on the SCP (e.g., the SCP 802). As such, in various embodiments, the computing system 100 may be configured to receive one or more search results generated based on the performance of the search query resolution based on the SCP (e.g., the SCP 802).

Additionally, the computing system 100 may be configured to determine whether the one or more search results comprise one or more null search results and/or determine whether the SCP has been tagged as verified.

If it is determined that the one or more search results comprise one or more null search results and that the SCP (e.g., the SCP 802) is tagged as not verified, and further determined that the SCP is a true pair, the computing system 100 may tag the SCP as verified. Additionally or alternatively, if it is determined that the one or more search results comprise one or more null search results and that the SCP is tagged as not verified, and further determined that the SCP is not a true pair, the computing system 100 may determine whether the SCP is valid. In various examples, determining whether the SCP is valid comprises determining at least one or more of a relevancy, appropriateness, or correctness associated with the SCP. If it is determined that the SCP is irrelevant and/or inappropriate, the computing system 100 may log the SCP and remove the SCP from a respective autocomplete suggestion corpus.

Additionally or alternatively, if it is determined that the SCP is incorrect, the computing system 100 may be configured to cause at least one or more of updating of the weak-labeling model, re-training of the sentence classification model 610, generating of a new SCP (e.g., a new SCP 826), tagging of the new SCP as not verified, adding the new SCP to an autocomplete suggestion corpus, and/or re-training of the domain-aware autocomplete model.

Some techniques of the present disclosure enable the generation of action outputs that may be performed to initiate one or more predictive actions to achieve real-world effects. The multi-phase training techniques of the present disclosure may be used, applied, and/or otherwise leveraged to generate a domain-aware autocomplete model, which may help in the computer generation of one or more autocomplete suggestions based on end user input associated with a respective search engine (e.g., a search engine associated with a respective organization, enterprise, and/or individual associated with a target domain). The domain-aware autocomplete model of the present disclosure may be leveraged to initiate the performance of various computing tasks that improve the performance of a computing system (e.g., a computer itself, etc.) with respect to various predictive actions performed by the computing system 100, such as for the generation of relevant autocomplete suggestions, SCPs, and/or the like. Example predictive actions may also include the automatic determination of the relevance, appropriateness, and/or correctness of one or more autocomplete suggestions, SCPs, and/or the like.

In some examples, the computing tasks may include predictive actions that may be based on a prediction domain. A prediction domain may include any environment in which computing systems may be applied to achieve real-word insights, such as relevant autocomplete suggestions, SCPs, and/or the like, and to initiate the performance of computing tasks, such as predictive actions to act on the real-world insights such as initiating the performance of one or more search query resolutions based on respective SCPs. These predictive actions may cause real-world changes, for example, by controlling a hardware component, providing alerts, prompting interactive actions, and/or the like.

Examples of prediction domains may include financial systems, clinical systems, autonomous systems, robotic systems, and/or the like. Predictive actions in such domains may include the initiation of automated instructions across and between devices, automated notifications, automated scheduling operations, automated precautionary actions, automated security actions, automated data processing actions, automated data compliance actions, automated data access enforcement actions, automated adjustments to computing and/or human data access management, and/or the like.

In some embodiments, the multi-phase training techniques described herein are applied to initiate the performance of one or more predictive actions. A predictive action may depend on the prediction domain. In some examples, the computing system 100 may leverage the multi-stage training techniques described herein to generate and/or train one or more machine learning models that may be leveraged to initiate the generation of domain-specific autocomplete suggestions to facilitate generating relevant, appropriate, and/or correct search results based on a search query resolution automatically performed based on the domain-specific autocomplete suggestions.

VI. CONCLUSION

Many modifications and other embodiments will come to mind to one skilled in the art to which the present disclosure pertains having the benefit of the teachings presented in the foregoing descriptions and the associated drawings. Therefore, it is to be understood that the present disclosure is not to be limited to the specific embodiments disclosed and that modifications and other embodiments are intended to be included within the scope of the appended claims. Although specific terms are employed herein, they are used in a generic and descriptive sense only and not for purposes of limitation.

VII. EXAMPLES

Example 1. A computer-implemented method, the computer-implemented method comprising generating, by one or more processors and using a domain-aware autocomplete model, a label for an autocomplete suggestion based on a set of keywords within an autocomplete suggestion training dataset associated with a target domain source; generating, by the one or more processors and using a weak-labeling model, an updated label for the autocomplete suggestion by decorrelating the set of keywords from the label; generating, by the one or more processors and using a sentence classification model, a category for the autocomplete suggestion based on the updated label; generating, by the one or more processors and using the domain-aware autocomplete model, a suggestion-category pair (SCP) based on the autocomplete suggestion and the category for the autocomplete suggestion; and initiating, by the one or more processors, a performance of a search query resolution based on the SCP.

Example 2. The computer-implemented method of example 1, further comprising receiving one or more search results generated based on the performance of the search query resolution based on the SCP; determining whether the one or more search results comprise one or more null search results; and determining whether the SCP has been tagged as verified.

Example 3. The computer-implemented method of example 2, further comprising determining that the one or more search results comprise the one or more null search results and that the SCP is tagged as not verified; and in response to determining that the SCP is a true pair, tagging the SCP as verified.

Example 4. The computer-implemented method of example 2, further comprising determining that the one or more search results comprise the one or more null search results and that the SCP is tagged as not verified; and in response to determining that the SCP is not a true pair, determining whether the SCP is valid, wherein determining whether the SCP is valid comprises determining at least one or more of a relevancy, appropriateness, or correctness associated with the SCP.

Example 5. The computer-implemented method of example 4, further comprising determining that the SCP is at least one or more of irrelevant or inappropriate; and, in response to determining the SCP is at least one or more or irrelevant or appropriate, logging the SCP, and removing the SCP from an autocomplete suggestion corpus.

Example 6. The computer-implemented method of example 4, further comprising determining that the SCP is incorrect; and, in response to determining that the SCP is incorrect, updating the weak-labeling model, re-training the sentence classification model, generating a new SCP, tagging the new SCP as not verified, adding the new SCP to an autocomplete suggestion corpus, and re-training the domain-aware autocomplete model.

Example 7. The computer-implemented method of any of the preceding examples, wherein the domain-aware autocomplete model is language-agnostic, and wherein the computer-implemented method further comprises translating, via a neural language translation model, the autocomplete suggestion training dataset into an alternate language; and generating, via the domain-aware autocomplete model, one or more autocomplete suggestions in the alternate language.

Example 8. The computer-implemented method of any of the preceding examples, the computer-implemented method further comprising mapping the updated label associated with the autocomplete suggestion to a business vertical associated with a particular enterprise related to a target domain.

Example 9. The computer-implemented method of any of the preceding examples, the computer-implemented method further comprising generating the autocomplete suggestion training dataset, wherein the autocomplete suggestion training dataset is associated with one or more target domain sources within a target domain.

Example 10. The computer-implemented method of any of the preceding examples, wherein the set of keywords comprised in the autocomplete suggestion training dataset is associated with at least one of a domain taxonomy or a set of domain keywords generated by a search editor.

Example 11. The computer-implemented method of any of the preceding examples, wherein the autocomplete suggestion training dataset comprises at least one portion of website crawler data, taxonomy data, user query data, or keyword data associated with one or more target domain sources within a target domain.

Example 12. The computer-implemented method of example 11, wherein the at least one portion of website crawler data is retrieved by at least one of a rules-based website crawler or a machine learning model-based website crawler.

Example 13. A computing system comprising memory and one or more processors communicatively coupled to the memory, the one or more processors configured to generate, by one or more processors and using a domain-aware autocomplete model, a label for an autocomplete suggestion based on a set of keywords within an autocomplete suggestion training dataset associated with a target domain source; generate, by the one or more processors and using a weak-labeling model, an updated label for the autocomplete suggestion by decorrelating the set of keywords from the label; generate, by the one or more processors and using a sentence classification model, a category for the autocomplete suggestion based on the updated label; generate, by the one or more processors and using the domain-aware autocomplete model, a suggestion-category pair (SCP) based on the autocomplete suggestion and the category for the autocomplete suggestion; and initiate, by the one or more processors, a performance of a search query resolution based on the SCP.

Example 14. The computing system of example 13, wherein the one or more processors are further configured to receive one or more search results generated based on the performance of the search query resolution based on the SCP; determine whether the one or more search results comprise one or more null search results; and determine whether the SCP has been tagged as verified.

Example 15. The computing system of example 14, wherein the one or more processors are further configured to determine that the one or more search results comprise the one or more null search results and that the SCP is tagged as not verified; and in response to determining that the SCP is a true pair, tagging the SCP as verified.

Example 16. The computing system of example 14, wherein the one or more processors are further configured to determine that the one or more search results comprise the one or more null search results and that the SCP is tagged as not verified; and, in response to determining that the SCP is not a true pair, determine whether the SCP is valid, wherein determining whether the SCP is valid comprises determining at least one or more of a relevancy, appropriateness, or correctness associated with the SCP.

Example 17. The computing system of example 16, wherein the one or more processors are further configured to determine that the SCP is at least one or more of irrelevant or inappropriate; and, in response to determining the SCP is at least one or more or irrelevant or appropriate, log the SCP, and remove the SCP from an autocomplete suggestion corpus.

Example 18. The computing system of example 16, wherein the one or more processors are further configured to determine that the SCP is incorrect; and, in response to determining that the SCP is incorrect, update the weak-labeling model, re-train the sentence classification model, generate a new SCP, tag the new SCP as not verified, add the new SCP to an autocomplete suggestion corpus, and re-train the domain-aware autocomplete model.

Example 19. The computing system of any of the preceding examples, wherein the domain-aware autocomplete model is language-agnostic, and wherein the one or more processors are further configured to translate, via a neural language translation model, the autocomplete suggestion training dataset into an alternate language; and generate, via the domain-aware autocomplete model, one or more autocomplete suggestions in the alternate language.

Example 20. One or more non-transitory computer-readable storage media including instructions that, when executed by one or more processors, cause the one or more processors to generate, by using a domain-aware autocomplete model, a label for an autocomplete suggestion based on a set of keywords within an autocomplete suggestion training dataset associated with a target domain source; generate, by using a weak-labeling model, an updated label for the autocomplete suggestion by decorrelating the set of keywords from the label; generate, by using a sentence classification model, a category for the autocomplete suggestion based on the updated label; generate, by using the domain-aware autocomplete model, a suggestion-category pair (SCP) based on the autocomplete suggestion and the category for the autocomplete suggestion; and initiate a performance of a search query resolution based on the SCP.

The invention claimed is:

1. A computer-implemented method comprising:
generating, by one or more processors and using a domain-aware autocomplete model, a label for an autocomplete suggestion based on a set of keywords within an autocomplete suggestion training dataset associated with a target domain source;
generating, by the one or more processors and using a weak-labeling model, an updated label for the autocomplete suggestion by decorrelating the set of keywords from the label;
generating, by the one or more processors and using a sentence classification model, a category for the autocomplete suggestion based on the updated label;
generating, by the one or more processors and using the domain-aware autocomplete model, a suggestion-category pair (SCP) based on the autocomplete suggestion and the category for the autocomplete suggestion; and
initiating, by the one or more processors, a performance of a search query resolution based on the SCP.

2. The computer-implemented method of claim 1, further comprising receiving one or more search results generated based on the performance of the search query resolution based on the SCP.

3. The computer-implemented method of claim 2, further comprising:
determining that the one or more search results comprise one or more null search results and that the SCP is tagged as not verified; and
in response to determining that the SCP is a true pair, tagging the SCP as verified.

4. The computer-implemented method of claim 2, further comprising:
determining that the one or more search results comprise the one or more null search results and that the SCP is tagged as not verified; and
in response to determining that the SCP is not a true pair, determining one or more of a relevancy, an appropriateness, or a correctness associated with the SCP.

5. The computer-implemented method of claim 4, further comprising:
determining that the SCP is one or more of irrelevant or inappropriate; and
in response to determining that the SCP is one or more of irrelevant or inappropriate:
logging the SCP, and
removing the SCP from an autocomplete suggestion corpus.

6. The computer-implemented method of claim 4, further comprising:
determining that the SCP is incorrect; and
in response to determining that the SCP is incorrect:
updating the weak-labeling model,
re-training the sentence classification model,
generating a new SCP,
tagging the new SCP as not verified,
adding the new SCP to an autocomplete suggestion corpus, and
re-training the domain-aware autocomplete model.

7. The computer-implemented method of claim 1, wherein the domain-aware autocomplete model is language-agnostic, and the computer-implemented method further comprises:

translating, via a neural language translation model, the autocomplete suggestion training dataset into an alternate language; and generating, via the domain-aware autocomplete model, one or more autocomplete suggestions in the alternate language.

8. The computer-implemented method of claim 1, further comprising:

mapping the updated label associated with the autocomplete suggestion to a business vertical associated with a particular enterprise related to a target domain.

9. The computer-implemented method of claim 1, further comprising:

generating the autocomplete suggestion training dataset, wherein the autocomplete suggestion training dataset is associated with one or more target domain sources within a target domain.

10. The computer-implemented method of claim 1, wherein the set of keywords within the autocomplete suggestion training dataset is associated with at least one of a domain taxonomy or a set of domain keywords generated by a search editor.

11. The computer-implemented method of claim 1, wherein the autocomplete suggestion training dataset comprises at least one portion of website crawler data, taxonomy data, user query data, or keyword data associated with one or more target domain sources within a target domain.

12. The computer-implemented method of claim 11, wherein the at least one portion of website crawler data is retrieved by at least one of a rules-based website crawler or a machine learning model-based website crawler.

13. A computing system comprising memory and one or more processors communicatively coupled to the memory, the one or more processors configured to:

generate, using a domain-aware autocomplete model, a label for an autocomplete suggestion based on a set of keywords within an autocomplete suggestion training dataset associated with a target domain source;

generate, using a weak-labeling model, an updated label for the autocomplete suggestion by decorrelating the set of keywords from the label;

generate, using a sentence classification model, a category for the autocomplete suggestion based on the updated label;

generate, using the domain-aware autocomplete model, a suggestion-category pair (SCP) based on the autocomplete suggestion and the category for the autocomplete suggestion; and initiate a performance of a search query resolution based on the SCP.

14. The computing system of claim 13, wherein the one or more processors are further configured to receive one or more search results generated based on the performance of the search query resolution based on the SCP.

15. The computing system of claim 14, wherein the one or more processors are further configured to:

determine that the one or more search results comprise one or more null search results and that the SCP is tagged as not verified; and in response to a determination that the SCP is a true pair, tagging the SCP as verified.

16. The computing system of claim 14, wherein the one or more processors are further configured to:

determine that the one or more search results comprise the one or more null search results and that the SCP is tagged as not verified; and in response to a determination that the SCP is not a true pair, determine one or more of a relevancy, an appropriateness, or a correctness associated with the SCP.

17. The computing system of claim 16, wherein the one or more processors are further configured to:

determine that the SCP is one or more of irrelevant or inappropriate; and in response to a determination that the SCP is one or more of irrelevant or inappropriate:

log the SCP, and remove the SCP from an autocomplete suggestion corpus.

18. The computing system of claim 16, wherein the one or more processors are further configured to:

determine that the SCP is incorrect; and in response to a determination that the SCP is incorrect:

update the weak-labeling model, re-train the sentence classification model, generate a new SCP, tag the new SCP as not verified, add the new SCP to an autocomplete suggestion corpus, and re-train the domain-aware autocomplete model.

19. The computing system of claim 13, wherein the domain-aware autocomplete model is language-agnostic, and the one or more processors are further configured to:

translate, via a neural language translation model, the autocomplete suggestion training dataset into an alternate language; and generate, via the domain-aware autocomplete model, one or more autocomplete suggestions in the alternate language.

20. One or more non-transitory computer-readable storage media including instructions that, when executed by one or more processors, cause the one or more processors to:

generate, using a domain-aware autocomplete model, a label for an autocomplete suggestion based on a set of keywords within an autocomplete suggestion training dataset associated with a target domain source;

generate, using a weak-labeling model, an updated label for the autocomplete suggestion by decorrelating the set of keywords from the label;

generate, using a sentence classification model, a category for the autocomplete suggestion based on the updated label;

generate, using the domain-aware autocomplete model, a suggestion-category pair (SCP) based on the autocomplete suggestion and the category for the autocomplete suggestion; and initiate a performance of a search query resolution based on the SCP.

* * * * *